(12) United States Patent
Carless

(10) Patent No.: US 12,301,162 B2
(45) Date of Patent: May 13, 2025

(54) SYSTEM FOR MOUNTING ONE OR MORE SOLAR PANELS

(71) Applicant: SYSTEMS Pty Ltd, Terrey Hills (AU)

(72) Inventor: Glenn Carless, Terrey Hills (AU)

(73) Assignee: SYSTEMS Pty Ltd, Terrey Hills (AU)

( * ) Notice: Subject to any disclaimer, the term of this patent is extended or adjusted under 35 U.S.C. 154(b) by 0 days.

(21) Appl. No.: 18/546,818

(22) PCT Filed: Feb. 17, 2022

(86) PCT No.: PCT/AU2022/050112
§ 371 (c)(1),
(2) Date: Aug. 17, 2023

(87) PCT Pub. No.: WO2022/174294
PCT Pub. Date: Aug. 25, 2022

(65) Prior Publication Data
US 2024/0305239 A1    Sep. 12, 2024

(30) Foreign Application Priority Data

Feb. 18, 2021 (AU) ................................ 2021900411

(51) Int. Cl.
*H02S 20/10* (2014.01)
*H02S 20/30* (2014.01)

(52) U.S. Cl.
CPC .................................. *H02S 20/30* (2014.12)

(58) Field of Classification Search
CPC ....... H01L 31/00–078; Y02E 10/50–60; H02S 20/10–32

(Continued)

(56) References Cited

U.S. PATENT DOCUMENTS 8,240,109 B2    8/2012  Cusson et al.
2008/0087320 A1  4/2008  Mapes et al.
(Continued)

FOREIGN PATENT DOCUMENTS

AU    2016343293 A1    6/2018
CN    207652367 U      7/2018
(Continued)

OTHER PUBLICATIONS

JP-2014180195-A English (Year: 2014).*
(Continued)

*Primary Examiner* — Bach T Dinh
(74) *Attorney, Agent, or Firm* — FisherBroyles, LLP; Ian R. Walsworth

(57) ABSTRACT

A system for mounting one or more solar panels, the system comprising: a third sub-assembly comprising: angled posts arranged transverse to each other, each angled post including a penetrating end arranged to penetrate and engage a post-mounting surface; an engagement bracket arranged to engage the angled posts in use; and a second sub-assembly comprising: an elongated member adapted to be mounted to the engagement bracket at a distance from the post-mounting surface and to extend in a direction substantially perpendicular to the longitudinal direction of the post, the elongated member including at least one male portion that is elongated along a longitudinal axis of the elongated member; and a solar panel support member arranged to slidably receive an edge of a solar panel and including a female portion adapted to receive the at least one male portion of the elongated member, the solar panel support member adapted for pivotal movement about the longitudinal axis of the elongated member to provide a corresponding pivotal movement of the solar panel mounted thereto.

16 Claims, 24 Drawing Sheets

(58) Field of Classification Search
USPC .................................................. 136/243–265
See application file for complete search history.

(56) References Cited

U.S. PATENT DOCUMENTS

| | | |
|---|---|---|
| 2011/0068244 A1 | 3/2011 | Hartelius |
| 2013/0175231 A1 | 7/2013 | Klinga et al. |
| 2019/0372514 A1 | 12/2019 | Almy et al. |
| 2020/0072505 A1 | 3/2020 | Hudson et al. |
| 2020/0076354 A1 | 3/2020 | West et al. |
| 2020/0116394 A1 | 4/2020 | West et al. |

FOREIGN PATENT DOCUMENTS

| | | | | |
|---|---|---|---|---|
| DE | 102007052415 A1 | 5/2009 | | |
| DE | 202020105707 U1 | * 12/2020 | ......... | E04H 12/2215 |
| EP | 2498023 A1 | 9/2012 | | |
| JP | 2014180195 A | * 9/2014 | | |
| KR | 20110011765 U | 12/2011 | | |
| KR | 20200130553 A | * 11/2020 | | |

OTHER PUBLICATIONS

KR-20200130553-A English (Year: 2020).*
DE-202020105707-U1 English (Year: 2020).*
International Search Report from parent PCT/AU2022/050122. Aug. 25, 2022. 10 Pages.
Written Opinion from parent PCT/AU2022/050122. Aug. 25, 2022. 7 Pages.

* cited by examiner

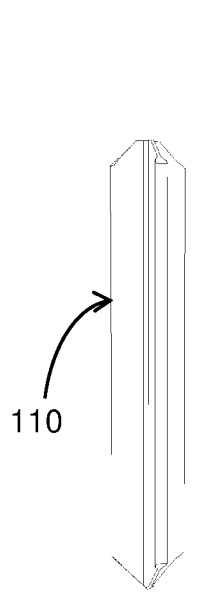
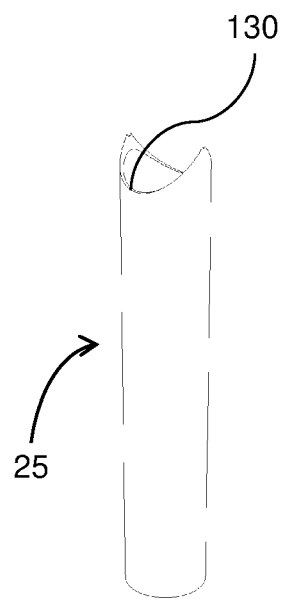
FIG. 17  FIG. 18
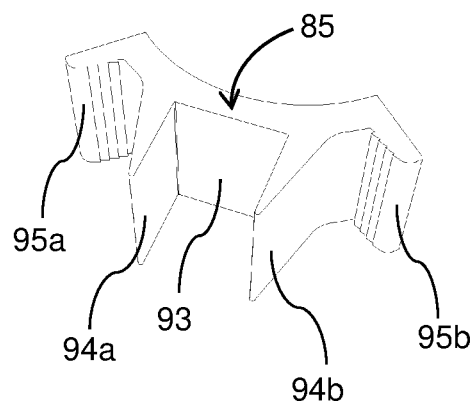
FIG. 19

SYSTEM FOR MOUNTING ONE OR MORE SOLAR PANELS

This application is a national stage application under 35 U.S.C. 371 and claims the benefit of PCT Application No. PCT/AU2022/050112, having an international filing date of Feb. 17, 2022, which designated the United States, which PCT application claims the benefit of Australian Provisional Patent Application No. 2021900411, filed Feb. 18, 2021, the entire disclosure of each of which are incorporated by reference herein.

FIELD

The present invention relates to a system for mounting one or more solar panels.

The invention has particular application to solar (photovoltaic) panel systems and it will be convenient to describe the invention herein in this exemplary context. It will be appreciated, however, that the invention is not necessarily limited to this particular application, but may also be employed in other applications requiring panels to be mounted relative to a surface.

BACKGROUND

Typically when installing a system for photovoltaic (PV) power generation, the system (which includes frames and other associated components) must be fully erected in-situ before each of the PV panels can be installed. This generally requires that each PV panel is transported to a desired site and mounted to the frames individually at the site. As will be appreciated, this is a time-consuming and labour-intensive process.

Power generation projects that are remote from electrical networks and have a relatively short service life typically require a power generation source that can be easily transported, assembled and disassembled at the end of the project. A disadvantage of systems that are typically used for PV power generation is that they are designed to be installed in one location for a significant period of time and are relatively difficult to disassemble. Accordingly, PV power generation can be costly and time consuming for remote projects having relatively short service lives.

Another disadvantage of systems that are typically used for PV power generation is that they use a matrix or framework that is held together using conventional mechanical fastening means such as nuts, bolts and screws. The mounting of the PV panels to the frames also relies on the use of conventional mechanical fastening means, which increases the complexity and costs associated with the assembly of such systems. Accordingly, the assembly of such systems in situ can be a labour-intensive and time-consuming process, and may not be feasible for projects having relatively short service lives as discussed above.

Another disadvantage of systems that are typically used for PV power generation is that the footing or anchoring systems (for example, to secure a pile or post of a frame in the ground) generally rely on the use of a concrete footing for the ground-engaging end of the pile or post. To create the concrete footing, a portion of the ground surrounding the pile is excavated and filled with concrete. Once the concrete sets, the pile or post is permanently secured in place. However, such known systems may not be sufficient to counter high lateral forces acting on the pile, post or shaft, for example in severe weather situations where sustained strong winds can cause the pile, post or shaft to collapse.

Further, such known systems are typically designed to have the pile or post permanently fixed to an attachment or concrete footing within the ground, thus making it difficult to remove the pile or post from the ground without the use of complex machinery. Therefore, such known systems do not have the capacity for the pile or post to easily be removed from one site, transported to another site and re-used.

Another disadvantage of systems that are typically used for PV power generation, particularly on large scale solar arrays, is the effect of wind load. Almost all large-scale solar arrays are based on the interconnection of a number of independent solar photovoltaic panels to create a much larger flat surface that are inclined at an angle to the ground surface below. In extremely high winds (for example, in the presence of cyclonic or hurricane-force winds), the wind forces may reach extreme levels, and may often result in a total demolition of the solar array due to structural failure (from bending and deformation). The components that make up typical solar arrays, such as perimeter frames and mounting systems, are not designed to counter these kinds of forces.

SUMMARY

It is an object of the present invention to substantially overcome, or at least ameliorate, one or more of the disadvantages of existing arrangements, or at least provide a useful alternative to existing arrangements.

According to the present invention, there is provided a system for mounting one or more solar panels, the system comprising:
  a third sub-assembly comprising:
    angled posts arranged transverse to each other, each angled post including a penetrating end arranged to penetrate and engage a post-mounting surface;
    an engagement bracket arranged to engage the angled posts in use; and
  a second sub-assembly comprising:
    an elongated member adapted to be mounted to the engagement bracket at a distance from the post-mounting surface and to extend in a direction substantially perpendicular to the longitudinal direction of the post, the elongated member including at least one male portion that is elongated along a longitudinal axis of the elongated member; and
    a solar panel support member arranged to slidably receive an edge of a solar panel and including a female portion adapted to receive the at least one male portion of the elongated member, the solar panel support member adapted for pivotal movement about the longitudinal axis of the elongated member to provide a corresponding pivotal movement of the solar panel mounted thereto.

The third sub system may further include an aperture profiled to receive the elongated member.

The third sub system may further include receiving means arranged to receive each of the angled posts.

The third sub system may further include the receiving means being arranged on sides of a central plate of the engagement bracket.

The third sub system may further include the receiving means being a rolled portion.

The third sub system may further include wherein the angled posts include a restraining means distal the penetrating end.

The third sub system may further include the restraining means being a flattened enlarged head.

The third sub system may further include wherein the engagement bracket are arranged to be distal the post mounting surface.

The third sub system may further include the angled posts are angled being 90° with respect to each other.

The second sub-assembly may further comprise a clip portion that is integrally formed with the solar panel support member, the clip portion having a pair of arms defining a gap therebetween to receive a portion of a perimeter frame of the solar panel.

The solar panel support member may be a primary solar panel support member, and the second sub-assembly further includes a secondary solar panel support member arranged to slidably receive an opposing edge of the solar panel.

The second sub-assembly may further comprise a coupling member having at least one male portion, and the secondary solar panel support member includes a female portion adapted to receive the male portion of the coupling member, with the secondary solar panel support member adapted for pivotal movement to provide a corresponding pivotal movement of the solar panel mounted thereto.

In a further embodiment, the present invention seeks to provide a sub-assembly for supporting solar panels including:
- angled posts arranged transverse to each other, each angled post including a penetrating end arranged to penetrate and engage a post-mounting surface;
- an engagement bracket arranged to receive the angled posts and hold the angled posts transverse to each other;
- wherein the engagement bracket includes an aperture arranged to receive an elongate member for supporting solar panels.

BRIEF DESCRIPTION OF THE DRAWINGS

Preferred embodiments of the present invention will be described by way of example only, with reference to the accompanying drawings, in which:

FIG. 17 is a schematic isometric view of an auxiliary post of the system shown in FIG. 1 in isolation;

FIG. 18 is a schematic isometric view of a post of the system shown in FIG. 1 in isolation;

FIG. 19 is an enlarged schematic isometric view of an alternative embodiment of a support element;

DETAILED DESCRIPTION

Figure 1:
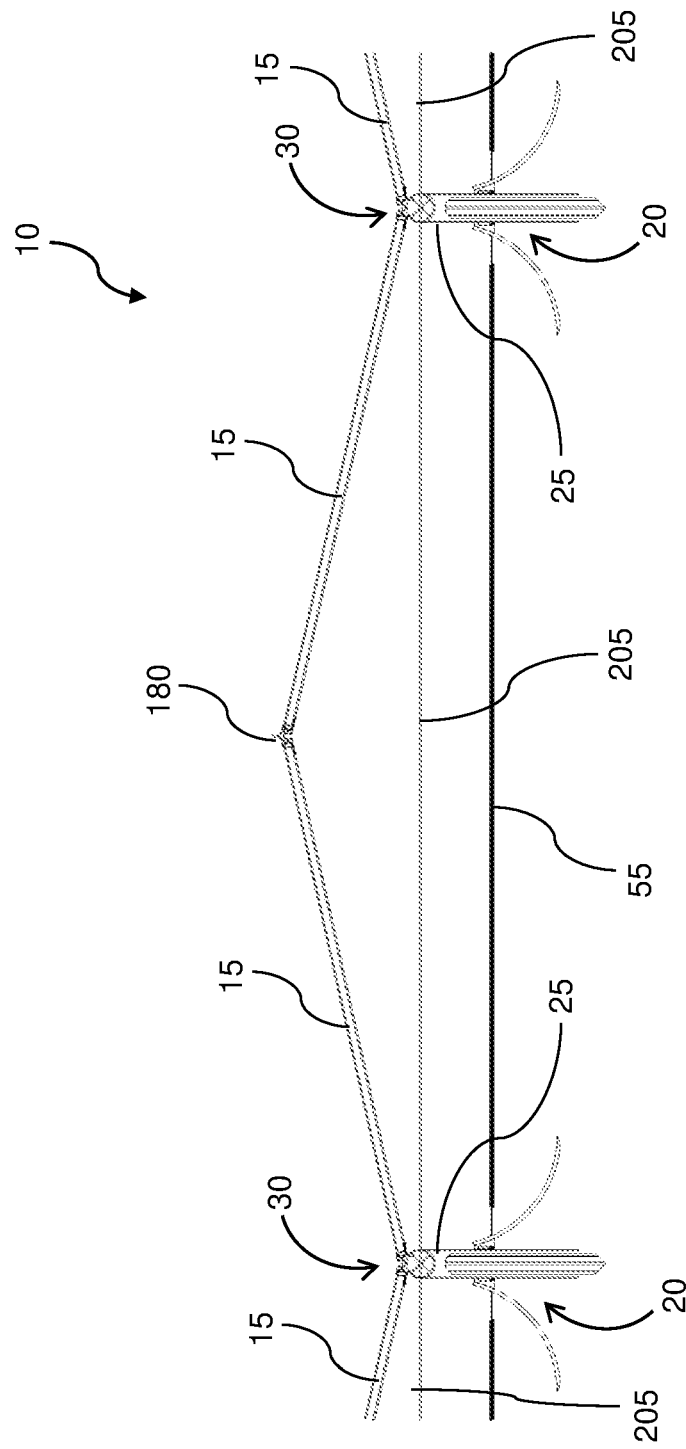
FIG. 1 is a schematic side view of a system for mounting one or more solar panels.
Figure 2:
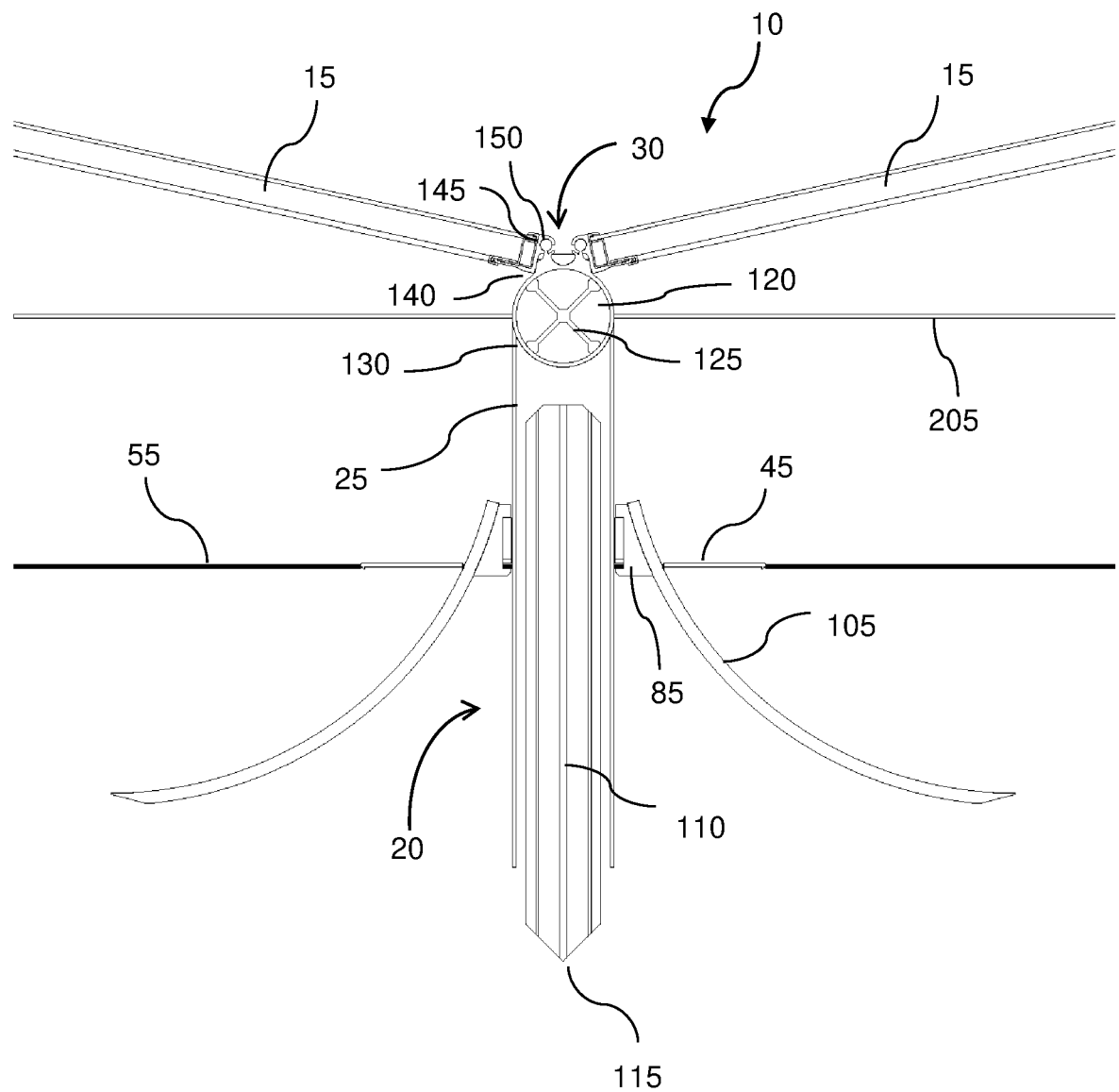
FIG. 2 is an enlarged schematic side view of the system shown in FIG. 1.
Figure 3:
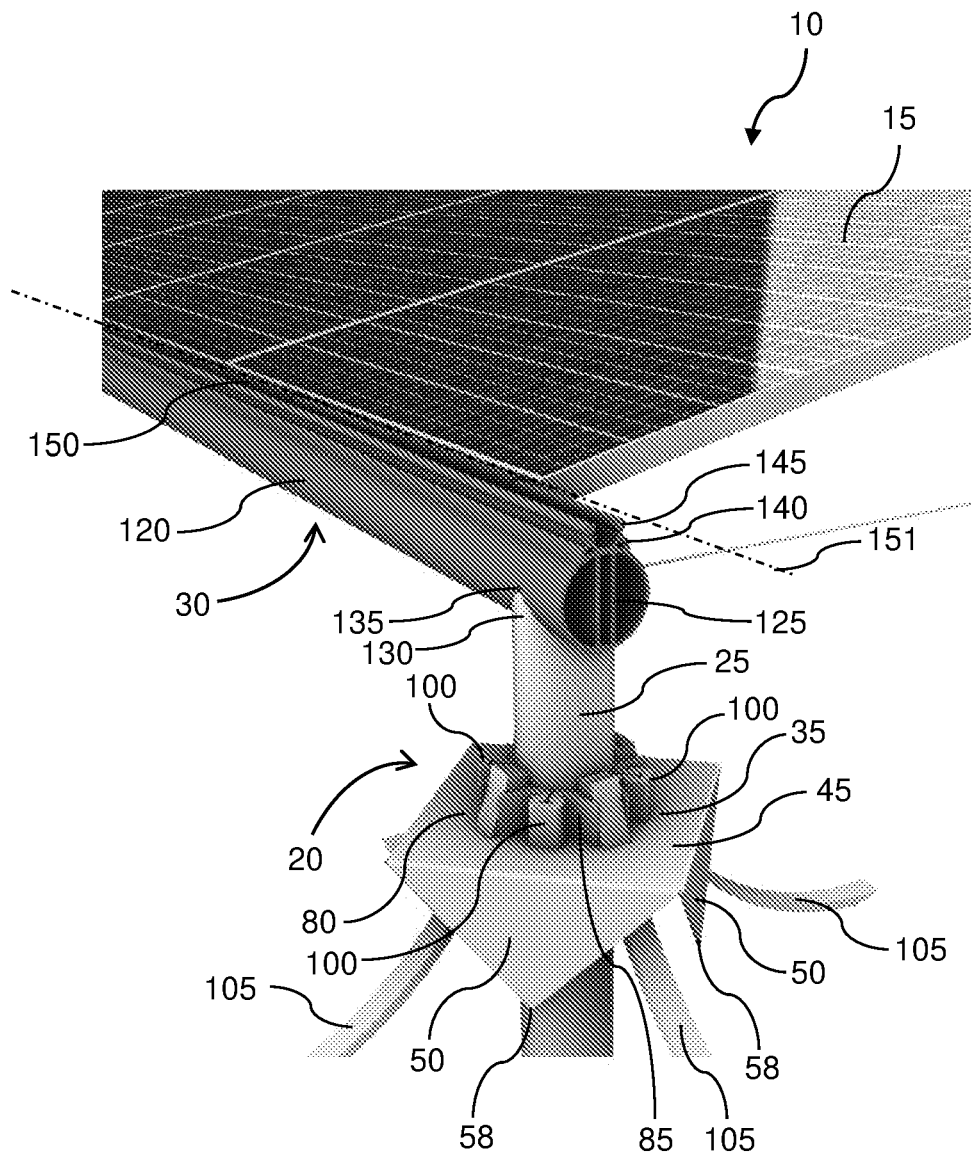
FIG. 3 is an enlarged schematic isometric view of the system shown in FIG. 1.
Figure 37:
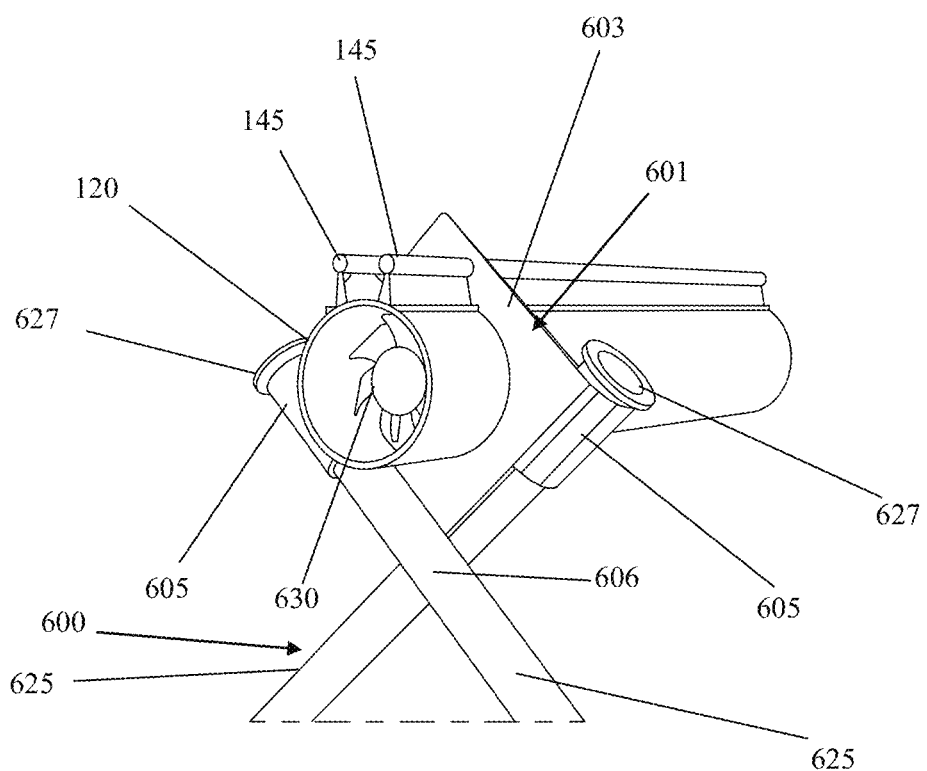
FIG. 37 is a perspective view of a third sub-assembly and fourth sub-assembly of a system and bracket for use in a system for mounting one or more solar panels.
Figure 38:
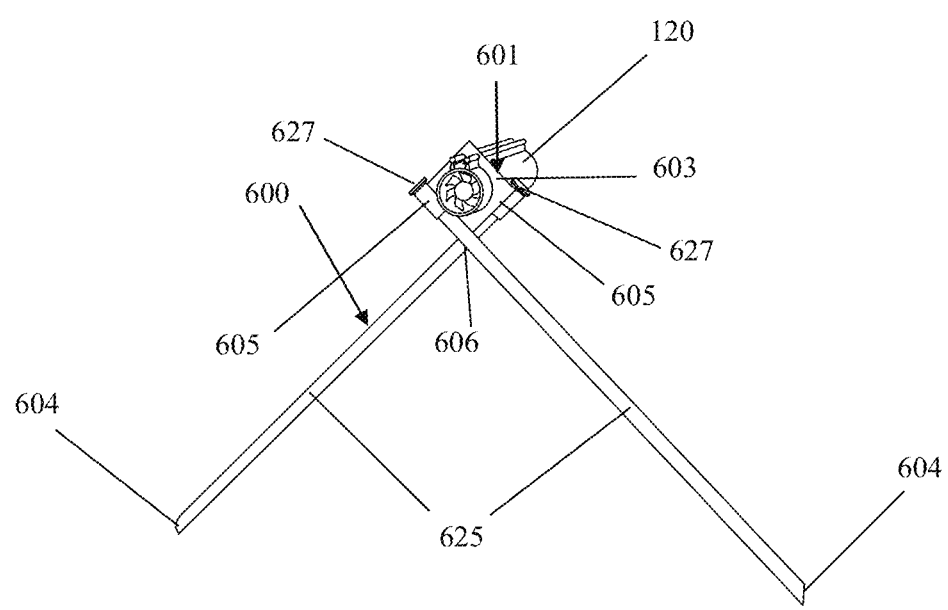
FIG. 38 is an end view of the third sub-assembly and a fourth sub-assembly of FIG. 37.
Figure 39:
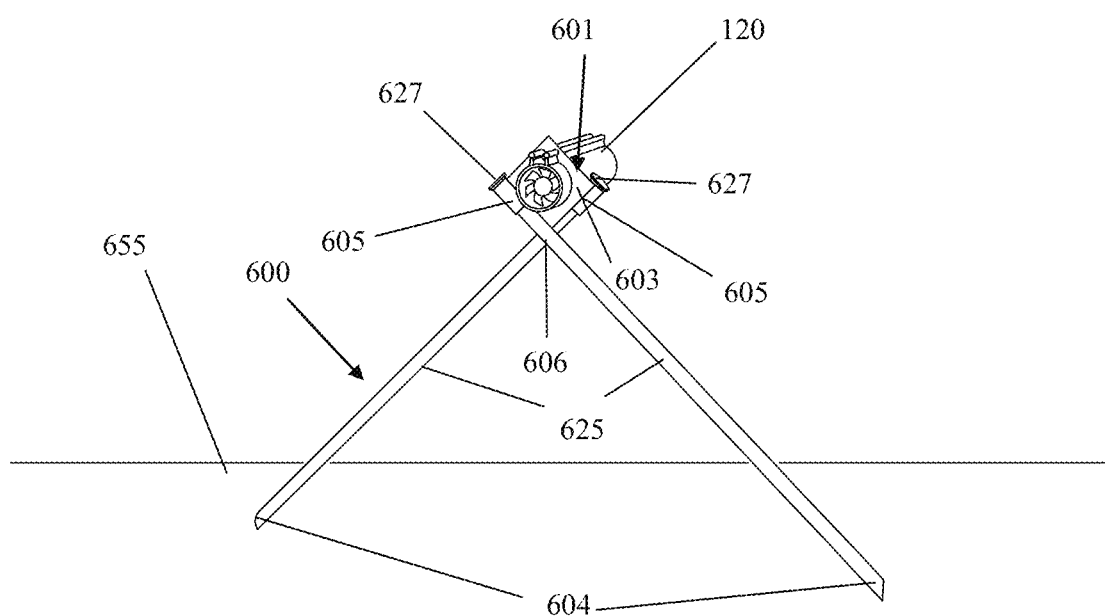
FIG. 39 is an end view of the third sub-assembly and a fourth sub-assembly of FIG. 37 in use.

In FIGS. 1 to 3 of the accompanying drawings, there is schematically depicted a system 10 for mounting one or more solar panels 15. The system 10 includes a first sub-assembly 20 for mounting a post 25 and a second sub-assembly 30 for mounting the one or more solar panels 15. FIGS. 37 to 39 illustrate a third sub-assembly 600 that can be used with second sub-assembly 30 in place of the first sub-assembly 20 for mounting solar panels 15.

As best shown in FIGS. 2 and 3, the first sub-assembly 20 includes the post 25, and a central portion 35 defining an aperture 40 therethrough (see FIGS. 4 and 6) configured to engage the post 25. The central portion 35 is designed to circumferentially engage the post 25. In the depicted embodiment, the post 25 is shown having a circular cross-section and the aperture 40 has a corresponding circular shape. It will, however, be appreciated that in other embodiments (not shown), the post 25 may have a cross-section of any other suitable shape (such as a rectangle), and the aperture 40 may be of a shape that corresponds to the cross-sectional shape of the post 25.

The first sub-assembly 20 further includes a support member 45 integrally formed with and extending outwardly from the central portion 35. The support member 45 includes a number of support portions 50. The central portion 35, support member 45, and support portions 50 may be formed by cutting and bending a single sheet of material into a pre-defined form. Suitable materials include galvanised steel, aluminium, plastic etc. In the depicted embodiment, there is a total of four support portions 50 provided for the support member 45. It will be appreciated that the number of support portions 50 may be decreased or increased depending on various requirements (for example, the overall size of the system 10, length of the post 25, or the physical condition of the area surrounding the post 25). For example, in alternative embodiments, there may be two support portions 50, three support portions 50, five support portions 50 etc. Each support portion 50 is configured to penetrate a post-mounting surface 55 in a substantially longitudinal direction relative to the post 25. Each support portion 50 also includes a cutting edge 58 to facilitate installation of the support member 45 to the post-mounting surface 55.

Figure 5:
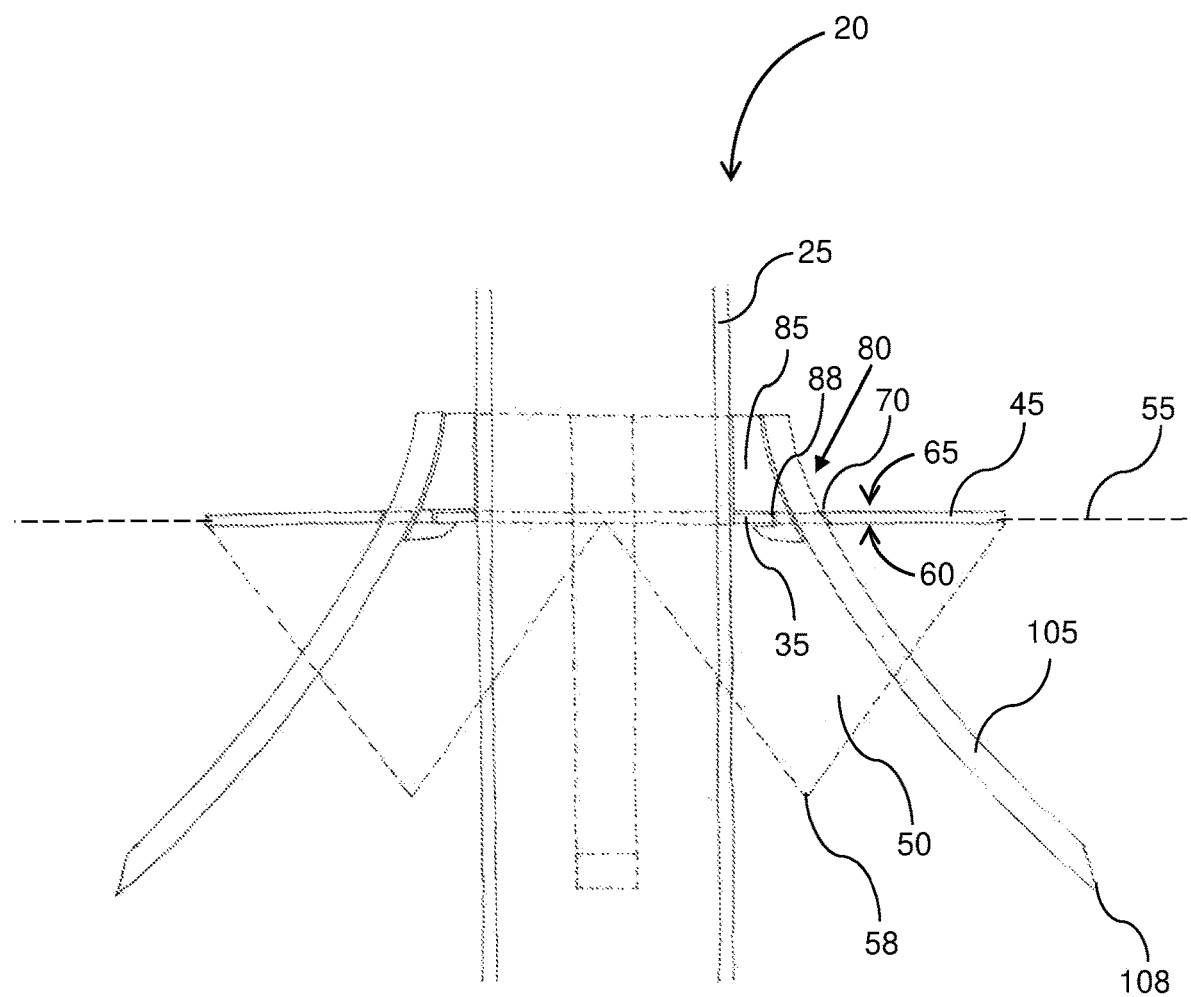
FIG. 5 is an enlarged schematic side view of the first sub-assembly shown in FIG. 4.

The support member 45 include a first surface 60 on a lowerside thereof, and a second surface 65 on an upperside therefore (see FIG. 5). The first surface 60 defines a plane along which the support member 45 extends from the central portion 35. Each support portion 50 of the support member 45 extends in a direction substantially perpendicular to the plane. It is envisaged that each support portion 50 of the support member 45 may alternatively extend in a direction having an angle of between 85 degrees and 95 degrees, or between 80 degrees and 100 degrees with respect to the plane. The first surface 60 is configured to abut the post-mounting surface 55 and is arranged to be substantially parallel to the post-mounting surface 55.

Figure 6:
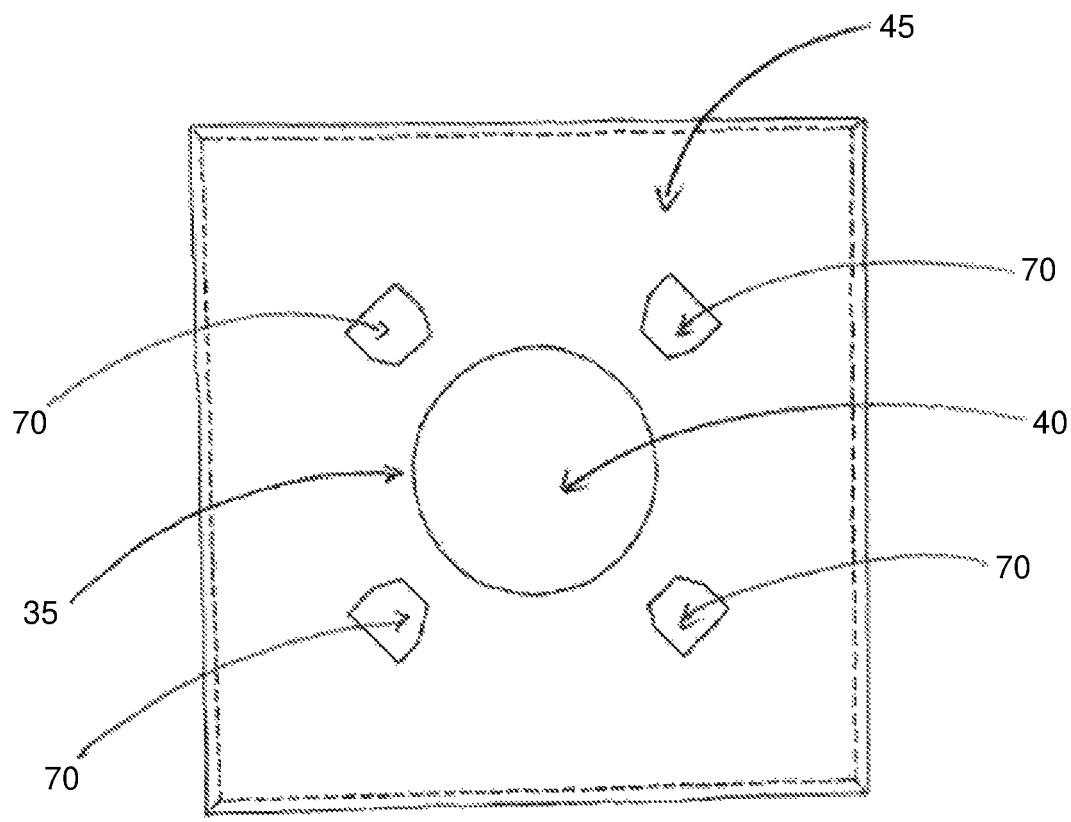
FIG. 6 is an enlarged schematic top view of a support member of the first sub-assembly shown in FIG. 4 in isolation.
Figure 20:
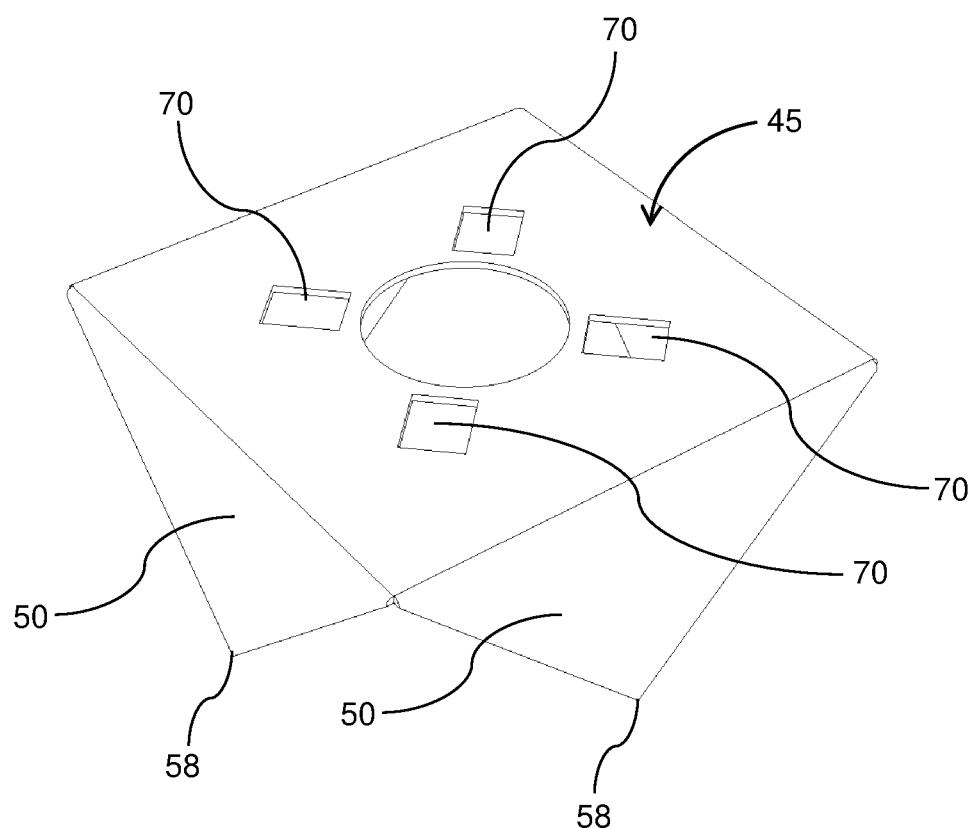
FIG. 20 is a schematic isometric view of an alternative embodiment of a support member.

The support member 45 further includes a number of apertures 70, as best shown in FIGS. 6 and 20. In the depicted embodiments, the support member 45 includes four apertures 70. It will be appreciated that the number of apertures 70 may be increased or decreased depending on the support requirements of the first sub-assembly 20, as will be discussed in further detail below. The apertures 70 may be formed by laser cutting or punching of the support member 45, and may be of any suitable shape to accommodate one or more of the components of the first sub-assembly 20 as described in further detail below.

The first sub-assembly 20 further includes a support assembly 80 that is adapted to be mounted in the apertures 70 and removably engage with the central portion 35 (see FIG. 5). The support assembly 80 includes a number of support elements 85. In the depicted embodiment, the support assembly 80 includes four support elements 85. Each support element 85 is adapted to be mounted in a respective one of the four apertures 70 such that all four support elements 85 are arranged adjacent to one another around the circumference of the post 25. As best shown in FIG. 5, each support element 85 includes a groove 88 adapted to receive and removably engage with the central portion 35. Accordingly, the central portion 35 slides into and engages with the groove 88 of the support element 85 to hold the support element 85 in place against the post 25. Each support element 85 is configured to extend towards and engage the post 25 at various locations around the post 25, thus providing a number of contact points with the post 25. It will be appreciated that in other embodiments (not shown), the support element 85 may not necessarily include the groove 88 for mounting to the central portion 35, and may be coupled by any other suitable means.

Figure 7:
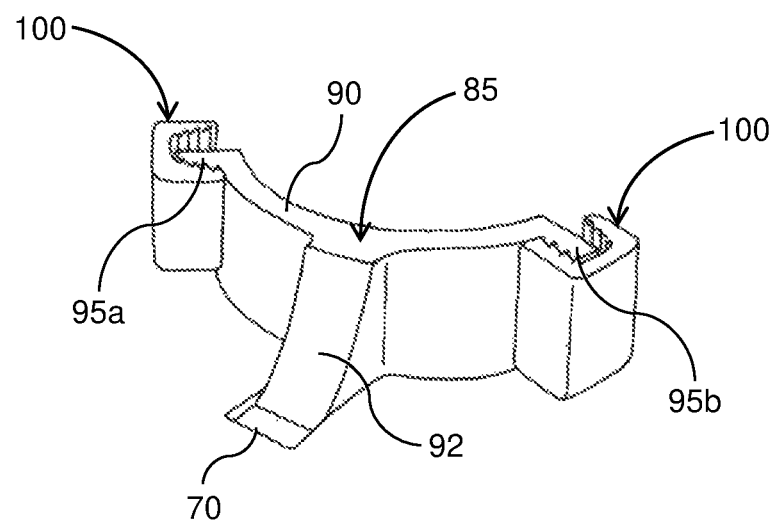
FIG. 7 is an enlarged schematic isometric view of various components of a support assembly of the first sub-assembly shown in FIG. 4.

As best shown in FIG. 7, each support element 85 includes an element body 90 having a central ramp portion 92 and two opposing end portions 95a and 95b. The central ramp portion 92 preferably has an arcuate surface. In the depicted embodiment, the two opposing end portions 95a and 95b are each arranged to protrude away from the element body 90 to form a flange. Each of the opposing end portions 95a and 95b may include a serrated or sawtooth-shaped surface. An alternative embodiment of the support element 85 is shown in FIG. 19, in which the central ramp portion 92 is replaced with a cradle portion 93 defined by a pair of protrusions 94a and 94b.

The support assembly 80 may further include a number of clamp members 100, with each clamp member 100 being configured to engage two adjacent support elements 85. In the depicted embodiment, the support assembly 80 includes four clamp members 100 to engage and form a connection between the four adjacent support elements 85. The clamp members 100 may each include inner serrated surfaces to engage the serrated surfaces of the end portions 95a and 95b of the two adjacent support elements 85. Each clamp member 100 is adapted to enclose and engage the end portions 95a and 95b of two adjacent support elements 85 by way of a friction or force fit, preferably between the respective serrated surfaces. It will be appreciated that in other embodiments (not shown), the clamp member 100 may engage the end portions 95a and 95b by way of a press-fit without necessarily requiring the serrated surfaces or interface between the clamp member 100 and the end portions 95a and 95b. In the depicted embodiment, the four clamp members 100 engage and connect the four support elements 85 to effectively form a tight collar which engages around the post 25, thus securing the post 25 with respect to the support assembly 80. It is envisaged that the support elements 85 and the clamp members 100 may formed by extrusion of any suitable material such as aluminium or the like. It will also be appreciated that in other embodiments (not shown), the support assembly 80 may not necessarily be provided with four support elements 85 and four clamp members 100, and may alternative be provided with any number of support elements 85 and a corresponding number of clamp members 100 (for example, two support elements 85 and two clamp members 100).

Figure 4:
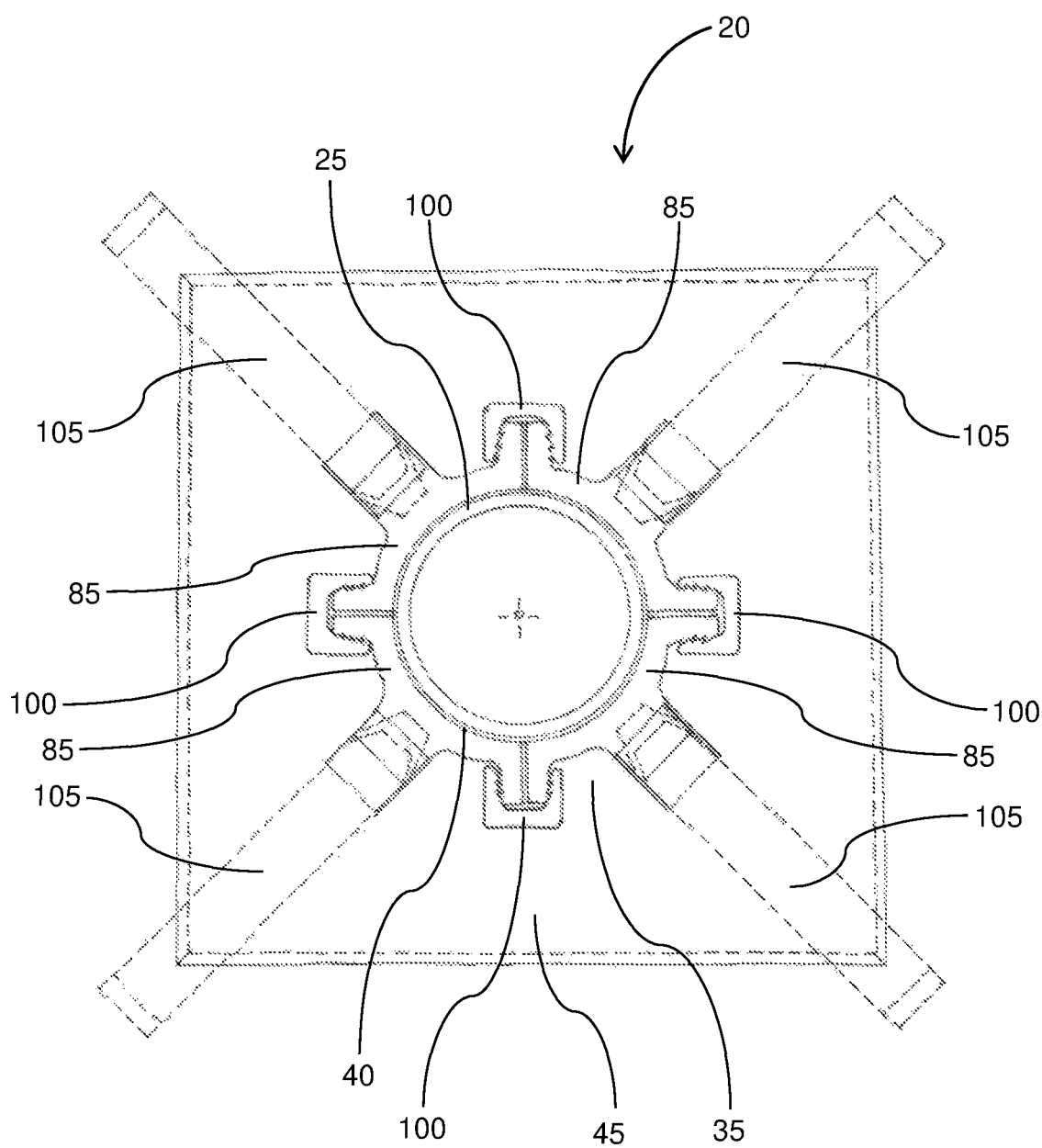
FIG. 4 is an enlarged schematic top view of a first sub-assembly of the system shown in FIG. 1.

Referring to FIGS. 3, 4 and 5, the support assembly 80 may further include a number of arcuate legs 105. Each arcuate leg 105 is configured to be inserted in one of the apertures 70 of the support member 45 and engage a respective one of the support elements 85. Each arcuate leg 105 may have an arcuate surface that corresponds to the arcuate surface of the central ramp portion 92 of the support element 85. When the arcuate leg 105 is mounted in the aperture 70, the corresponding arcuate surfaces of the arcuate leg 105 and the central ramp portion 92 allow the arcuate leg 105 to rest against and engage the support element 85, which assists in engaging the post 25.

As best shown in FIG. 5, each arcuate leg 105 includes a cutting edge 108 to penetrate the post-mounting surface 55. Each arcuate leg 105 is configured to penetrate the post-mounting surface 55 along an arcuate path corresponding to the shape of the arcuate leg 105. It is envisaged that the arcuate legs 105 may be formed from materials such as galvanised or heavy gauge steel, aluminum, or the like. It will be appreciated that the arcuate legs 105 may each penetrate the post-mounting surface 55 to assist in supporting the support member 45 and the post 25 so as to reduce or prevent both uplift and down forces on the first sub-assembly 20.

Returning to FIG. 2, and as also shown in FIG. 17, it will be appreciated that the first sub-assembly 20 may include an auxiliary post 110 that may be formed by extrusion of any suitable material such as aluminium or the like. The auxiliary post 110 may have a cruciform a cruciform cross-sectional shape and may include a cutting edge 115 to penetrate the post-mounting surface 55 to facilitate the insertion of the auxiliary post 110 into the post-mounting surface 55 to a nominated distance. The auxiliary post 110 is adapted to be inserted into the post 25 to provide additional structural strength and support for the post 25.

Figure 12:
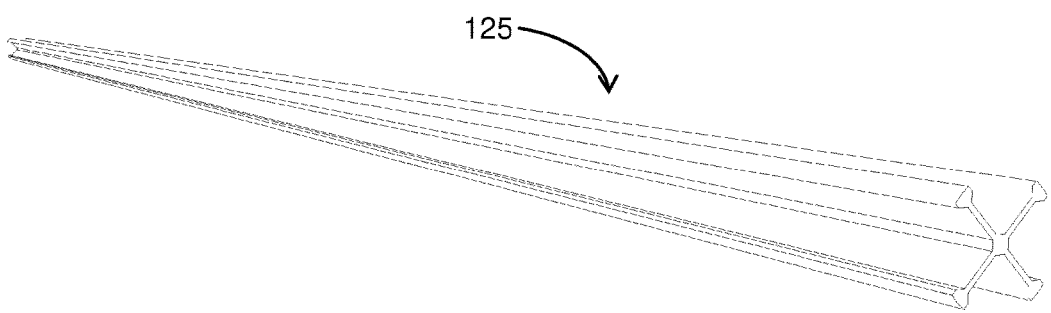
FIG. 12 is a schematic isometric view of an inner support component of the system shown in FIG. 1 in isolation.

As best shown in FIGS. 2 and 3, the second sub-assembly 30 of the system 10 includes an elongated member 120 adapted to be mounted to the post 25 at a distance from the post-mounting surface 55 and to extend in a direction substantially perpendicular to the longitudinal direction of extension or axis of the post 25. As described below with reference to FIGS. 37 to 39, the third sub-assembly 600 can replace the first sub-assembly 20 and post 25 in that further embodiment. The elongated member 120 is preferably in the form of a substantially hollow tube that may be formed by extrusion of any suitable material such as aluminium or the like. In one form, and in the embodiment depicted in FIGS. 2 and 12, an inner support component 125 may be formed separately and provided within the elongated member 120 to provide additional structural strength to the elongated member 120. In another form, and in the embodiment depicted in FIG. 3, for example, the inner support component 125 may be integrally formed with the elongated member 120 to provide additional structural strength to the elongated member 120. The inner support component 125 may have a cruciform cross-sectional shape as depicted in FIG. 2, or have the form of a pair of flat extrusions that preferably extend radially and along the length of the elongated member 120. It will be appreciated that the inner support component 125 may take any other shape or form suitable for providing additional structural strength to the elongated member 120.

The post 25 is preferably sectioned at an upper portion thereof to provide a semi-circular cradle 130 (see also FIG. 18) for receiving the elongated member 120. As best shown in FIG. 3, the elongated member 120 may include a slot 135 to facilitate the cradling of the elongated member 120 in the semi-circular cradle 130. In the embodiment of FIGS. 37 to 39, the elongate member 120 is received in the aperture in the central plate 603 of the engagement bracket 601. It will be understood that the semi-circular cradle 130 is provided to accommodate the tubular outer wall and overall shape of the elongate member 120 in the depicted embodiment, however, in other embodiments (not shown), the post 25 and the elongated member 120 may have any other suitable corresponding cross-sectional shapes. The elongated member 120 may also be coupled to the auxiliary post 110 (for example, by way of one or more anchors, not shown) to provide additional structural strength.

Figure 8:
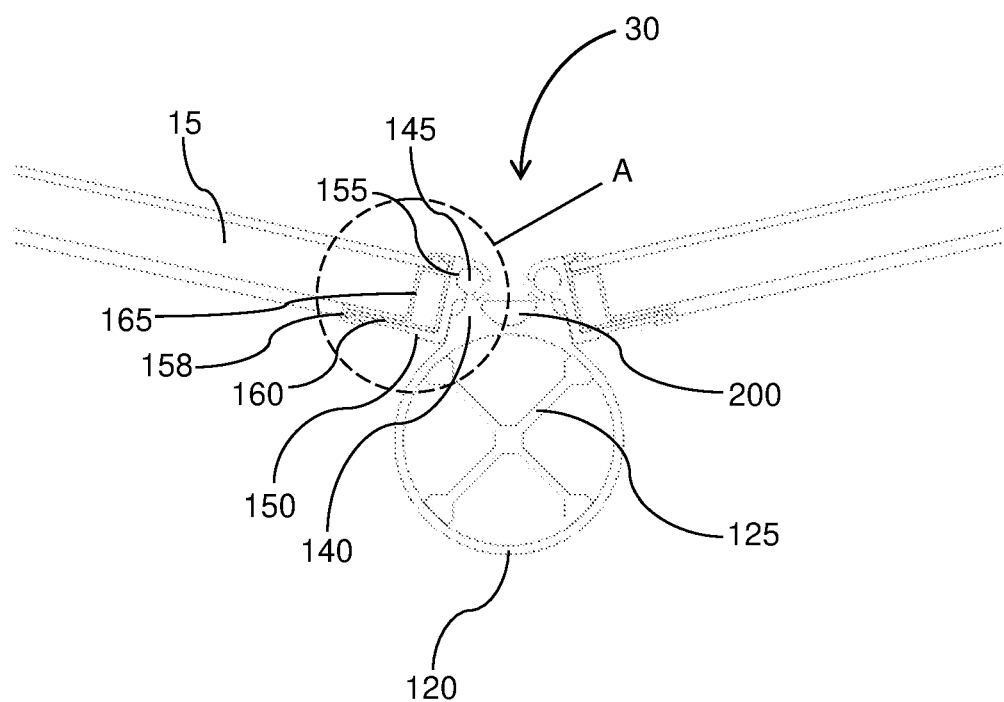
FIG. 8 is an enlarged schematic side view of the second sub-assembly of the system shown in FIG. 1.
Figure 11:
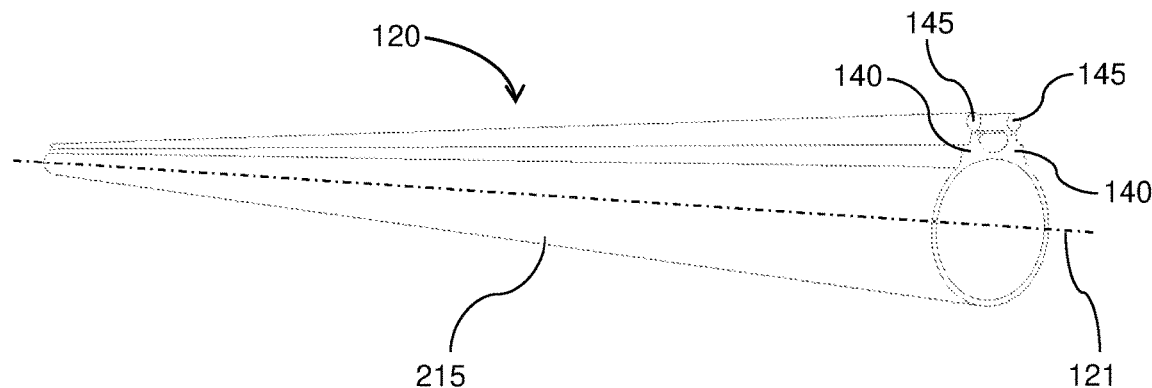
FIG. 11 is a schematic isometric view of an elongated member of the system shown in FIG. 1 in isolation.

As best shown in FIGS. 2, 3 and 8, the elongated member 120 includes at least one male portion 140 that extends outwardly along an outer surface of the elongated member 120. In the depicted embodiment, the elongated member 120 is provided with two male portions 140. Each male portion 140 is preferably elongated along the longitudinal axis 121 of the elongated member 120 (see FIG. 11). In the depicted embodiment, each male portion 140 includes an end portion 145 having a substantially circular cross-section, and also preferably elongated along the longitudinal axis of the elongated member 120.

Figure 9:
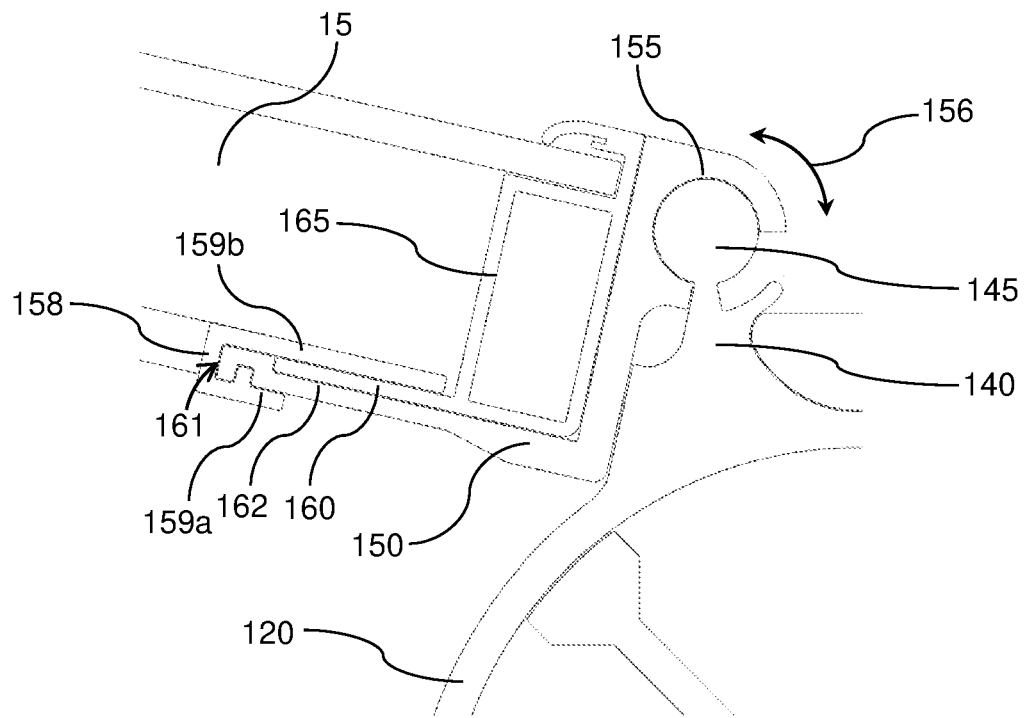
FIG. 9 is an enlarged schematic side view of portion A of the second sub-assembly shown in FIG. 8.
Figure 10:
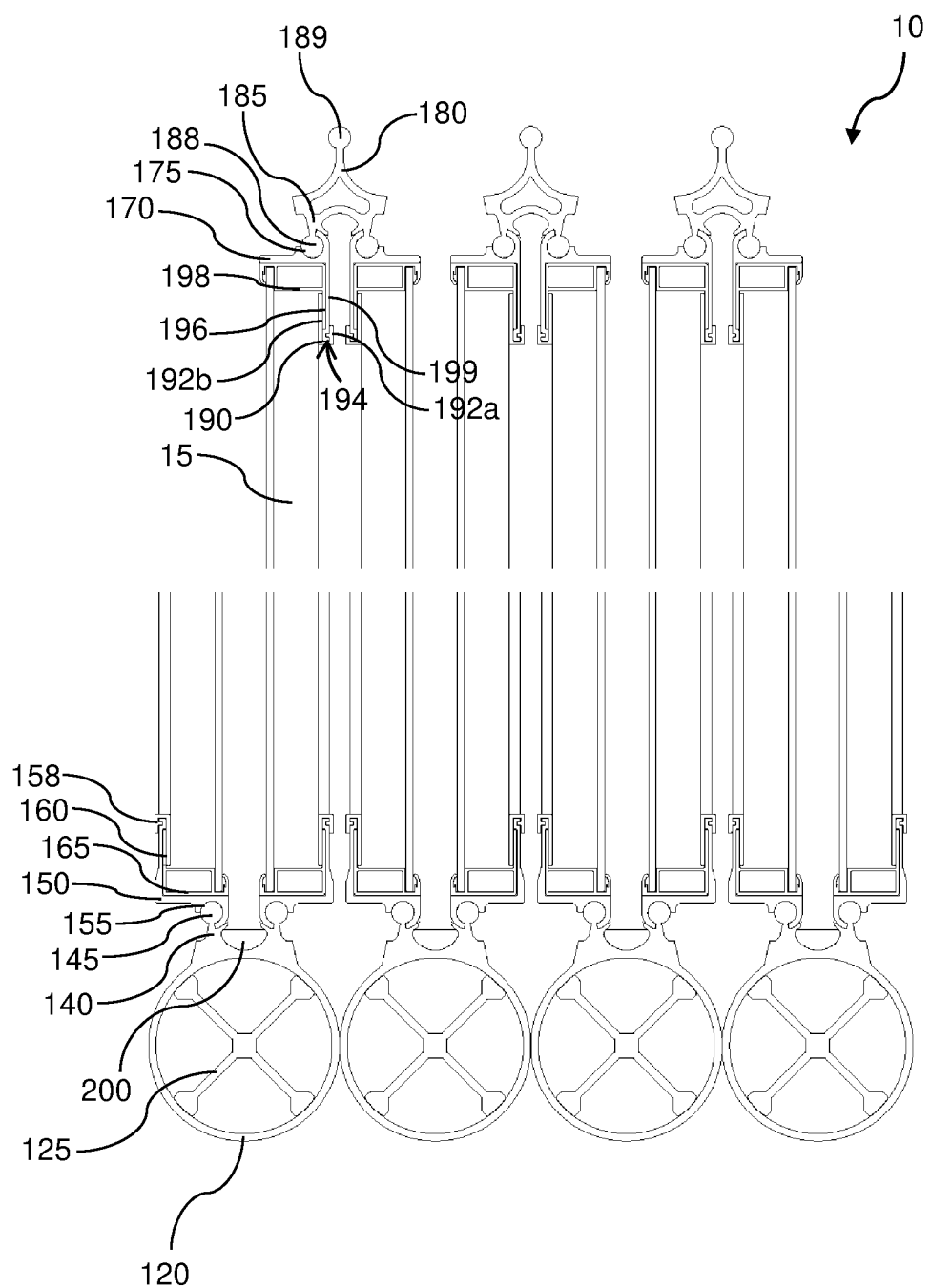
FIG. 10 is a schematic side view of the system shown in FIG. 1 in a folded configuration.

Referring now to FIGS. 8 to 10, the second sub-assembly 30 of the system 10 also includes a primary solar panel support member 150 arranged to slidably receive one of the solar panels 15. The primary solar panel support member 150 may be formed by extrusion of any suitable material such as aluminium or the like. As best shown in FIG. 3, the primary solar panel support member 150 is elongated along a longitudinal axis 151 and includes a female portion 155 (see FIGS. 8 to 10 and 14) adapted to receive the at least one male portion 140 of the elongated member 120. It will be appreciated that the female portion 155 may be formed as a cradle having a substantially circular cross-section to correspond to the substantially circular cross-sectional shape of the end portion 145 of the at least one male portion 140. The corresponding cross-sectional shapes of the end portion 145 and the female portion 155 may thus allow for slidable coupling of the solar panel support member 150 to the elongated member 120. The corresponding cross-sectional shapes of the end portion 145 and the female portion 155 may also allow pivotal movement of the primary solar panel support member 150 about the at least one male portion 145 of the elongated member 120 (for example, about arc 156 as shown in FIG. 9), and to provide a corresponding pivotal movement of the solar panel 15 mounted thereto. It will be understood that the corresponding cross-sectional shapes of the end portion 145 and the female portion 155 may effectively provide a 'ball-and-socket' type coupling to allow the primary solar panel support member 150 to rotate about the longitudinal axis 121 of the elongated member 120.

Figure 15:
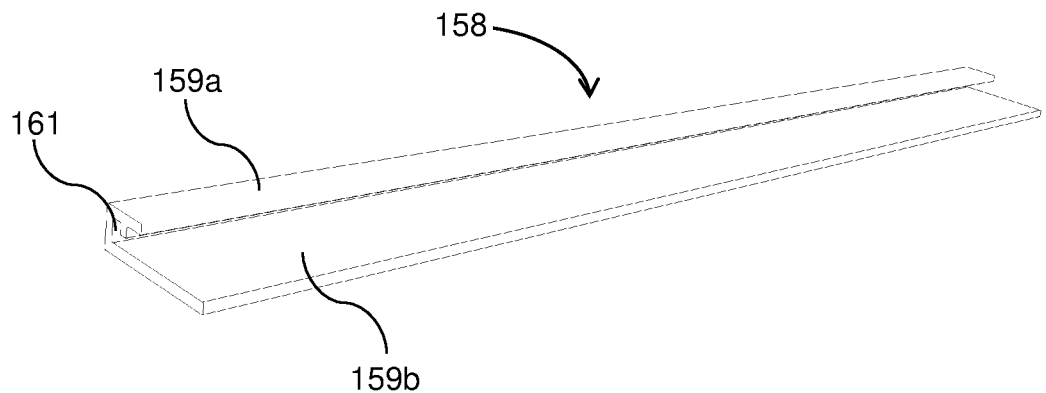
FIG. 15 is a schematic isometric view of a primary clip portion of the system shown in FIG. 1 in isolation.
Figure 16:
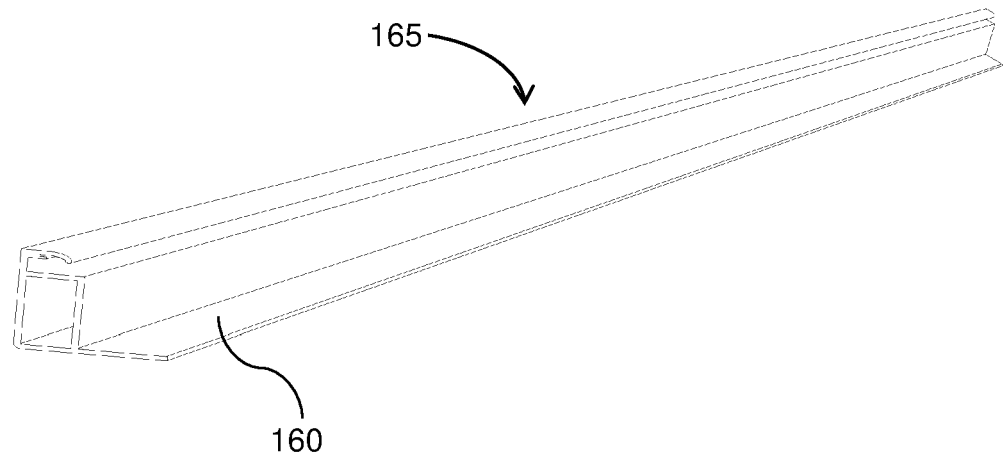
FIG. 16 is a schematic isometric view of a perimeter frame of a solar panel of the system shown in FIG. 1 in isolation.

As best shown in FIG. 9, the second sub-assembly 30 of the system 10 may include a primary clip portion 158 that may either be separately formed or integral to the primary solar panel support member 150. In the depicted embodiment (see also FIG. 15), the primary clip portion 158 is formed separately to the primary solar panel support 150 and is slidably coupled thereto. The primary clip portion 158 has a generally U-shaped cross-section having a pair of opposing arms 159*a* and 159*b* that define a gap 161 therebetween to slidably receive a portion 160 of a perimeter frame 165 of the solar panel 15 (see also FIG. 16). In the depicted embodiment, the gap 161 between the pair of opposing arms 159*a* and 159*b* receives (preferably by way of frictional engagement or a press fit) both an end portion or arm 162 of the primary solar panel support member 150, as well as the portion 160 of the perimeter frame 165. Any one or more of the pair of opposing arms 159*a* and 159*b*, the end portion or arm 162 of the primary solar panel support member 150, or the portion 160 of the perimeter frame 165, may include protrusions, serrated surfaces, or other features to facilitate coupling.

Referring to the embodiment of FIG. 10, an array of solar panels 15 is shown and in this embodiment, the second sub-assembly 30 of the system 10 may also include a secondary solar panel support member 170 (see top portion of FIG. 10) arranged to slidably receive one of the solar panels 15. It will be appreciated that the secondary solar panel support member 170 functions in a similar manner to the primary solar panel support member 150 discussed above, whereby the primary solar panel support member 150 is adapted to slidably receive one end of the solar panel 15 and the secondary solar panel support member 170 is adapted to received an opposing end of the solar panel 15. The secondary solar panel support member 170 may also be formed by extrusion of any suitable material such as aluminium or the like. The secondary solar panel support member 170 includes a female portion 175. The array includes multiple primary solar panel support members 150 and secondary solar panel support members 170 as shown.

Figure 13:
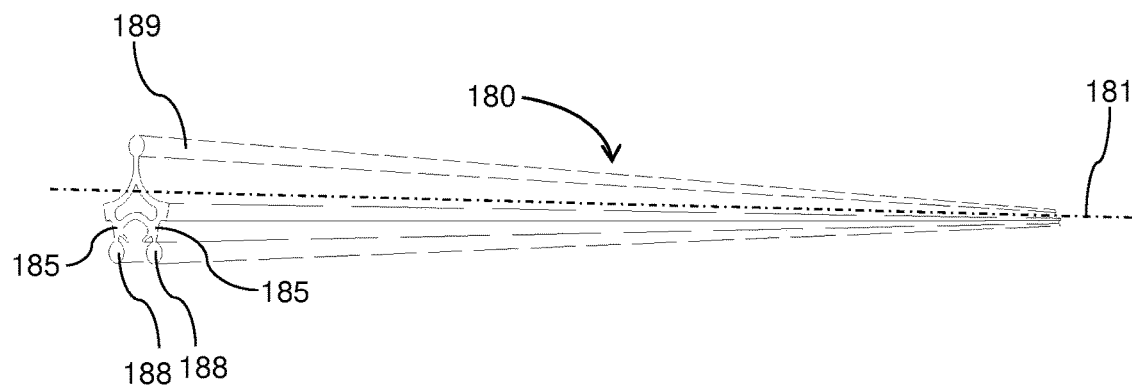
FIG. 13 is a schematic isometric view of a coupling member of the system shown in FIG. 1 in isolation.
Figure 14:
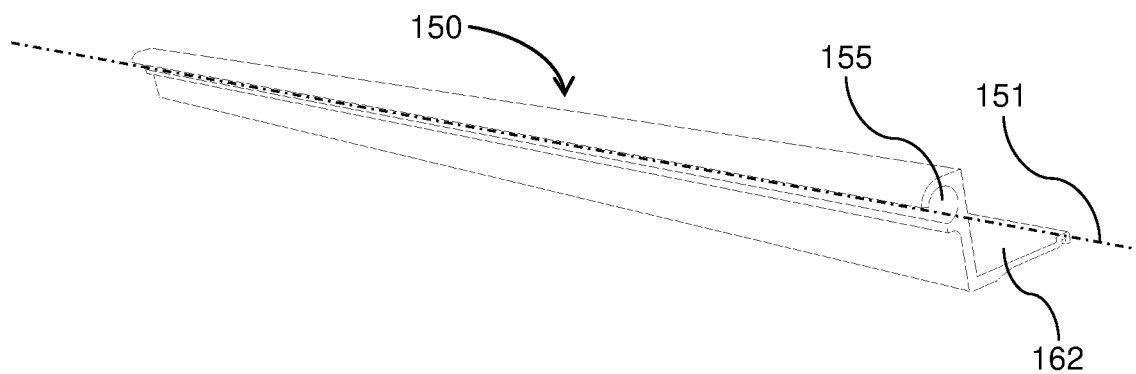
FIG. 14 is a schematic isometric view of a primary solar panel support member of the system shown in FIG. 1 in isolation.

In the depicted embodiment, the second sub-assembly 30 of the system 10 may further include a coupling member 180 (see also FIG. 13) that is elongated along a longitudinal axis 181. The coupling member 180 includes at least one male portion 185 having an end portion 188 with a substantially circular cross-section. In the depicted embodiment, the coupling member 180 is provided with two male portions 185. Each male portion 185 is preferably also elongated along the longitudinal axis 181 of the coupling member 180. The coupling member 180 may further include a central portion 189 that extends in a direction away from the two male portions 185. It will be appreciated that the coupling member 180 may at least support the load generated by the solar panels 15 mounted thereto (via the secondary solar panel support member 170).

The female portion 175 of the secondary solar panel support member 170 may be formed as a cradle having a substantially circular cross-section to correspond to the substantially circular cross-sectional shape of the end portion 188 of the at least one male portion 185 of the coupling member 180. The corresponding cross-sectional shapes of the end portion 188 and the female portion 175 may also allow for pivotal movement of the secondary solar panel support member 170 about the at least one male portion 185 of the coupling member 120, and to provide a corresponding pivotal movement of the solar panel 15 mounted thereto. It will be understood that the corresponding cross-sectional shapes of the end portion 188 and the female portion 175 may effectively provide a 'ball-and-socket' type coupling to allow the secondary solar panel support member 170 to rotate about the longitudinal axis 121 of the elongated member 120.

The second sub-assembly 30 of the system 10 may also include a secondary clip portion 190 (see top portion of FIG. 10) that functions in a similar manner to the primary clip portion 158 discussed above. As such, the secondary clip portion 190 may also either be separately formed or integral to the secondary solar panel support member 170. In the depicted embodiment, the secondary clip portion 190 is formed separately to the secondary solar panel support member 170 and is slidably coupled thereto. The secondary clip portion 190 has a generally U-shaped cross-section having a pair of opposing arms 192*a* and 192*b* that define a gap 194 therebetween to slidably receive a portion 196 of a perimeter frame 198 of the solar panel 15. In the depicted embodiment, the gap 194 between the pair of opposing arms 192*a* and 192*b* receives (preferably by way of frictional engagement or a press fit) both an end portion or arm 199 of the secondary solar panel support member 170, as well as the portion 196 of the perimeter frame 198. Any one or more of the pair of opposing arms 192*a* and 192*b*, the end portion or arm 199 of the secondary solar panel support member 170, or the portion 196 of the perimeter frame 198, may include protrusions, serrated surfaces, or other features to facilitate coupling.

The second sub-assembly 30 of the system 10 may also include a spacer 200 to provide additional structural strength to a small area directly above the footing (i.e. the first sub-assembly 20). The spacer 200 is preferably extruded from aluminium and also elongated along the longitudinal axis 121 of the elongated member 120.

In the interest of clarity, the reference numerals of the various componentry associated with the primary solar panel support member 150 and the secondary solar panel support member 170 as discussed above have not been repeated throughout the array of solar panels 15 shown in FIG. 10, although it will be understood that the various componentry is similarly applicable for each solar panel 15 as shown.

Returning to FIGS. 1 and 2, the system 10 may also include a restraining means 205 that extends between two adjacent second sub-assemblies 30. In the depicted embodiment, the restraining means 205 extends and is removably coupled to the post 25 by way of a clamp, latch, protrusion and receiving slot, screw, clip (not shown) or other coupling means. The restraining means 205 is preferably formed as a bar or rod that extends between adjacent posts 25 to form a bottom cord of a triangular configuration made with the two inclined solar panels 15 as shown. The length of the restraining means 205 may thus set the profile of the triangular configuration, and may also set the length of system 10 in the unfolded configuration as will be described in further detail below. In one embodiment, the restraining means is extendable so that the distance between posts is adjustable. In one embodiment, the restraining means 205 is extendable through a telescoping arrangement.

In FIGS. 1, 2, 8 and 9, the system 10 is shown in an unfolded (or installed) configuration whereby the solar panels 15 have been pivotally moved (by way of the corresponding pivotal movement of the primary solar panel support member 150 about the elongated member 120, and the corresponding pivotal movement of secondary solar panel support member 170 about the coupling member 120 as discussed above) such that they are arranged at an angle in relation to one another. It will be appreciated that this unfolded configuration of the system 10 may effectively be similar to a 'bifold door' or 'concertina' type configuration. Referring to the arrangement of FIG. 1, for example, the first solar panel 15 in the array of solar panels 15 may be arranged at an incline of between approximately 0 to 90 degrees relative to the post-mounting surface 55, and the second solar panel 15 in the array of solar panels 15 (which is coupled to the first solar panel by way of the coupling member 180 may be arranged at an incline of between approximately 90 to 180 degrees relative to the post-mounting surface 55, and so on. It will be understood that each solar panel 15 may be adjusted to be arranged at any suitable incline or angle relative to the post-mounting surface 55 (or even be completely parallel to the post-mounting surface 55) so as to facilitate an appropriate level of exposure to sunlight.

In FIG. 10, the system 10 is shown in an folded (or uninstalled/storage) configuration whereby the solar panels 15 have been pivotally moved (by way of the corresponding pivotal movement of the primary solar panel support member 150 about the elongated member 120, and the corresponding pivotal movement of secondary solar panel support member 170 about the coupling member 120 as discussed above) such that they are arranged at parallel to one another. It will thus be appreciated that the solar panels 15 may be compacted into a form that allows for ease of transportation and storage.

The installation of the system 10 will now be described.

The system 10 is firstly preferably assembled off-site (for example, in a factory), whereby the various components of the system 10 are coupled to one another. For example, the elongated member 120 is coupled to the primary solar panel support member 150, which is in turn coupled to one end of the solar panel 15. The opposing end of the solar panel 15 is then coupled to the secondary solar panel support member 170, which is in turn coupled to the coupling member 180 (which, in the depicted embodiment, is coupled to another secondary solar panel support member 170 that is associated with a further solar panel 15 and so on). Once all the components of the system 10 have been assembled, the system 10 is then moved into the folded configuration (for example, as shown in FIG. 10) whereby the solar panels 15 are arranged parallel to one another in a relatively compact form. The system 10 may then be transported on-site for installation.

To install the system 10, the post 25 (along with the auxiliary post 110 in some embodiments) of one of the first sub-assemblies 20 is driven into the post-surface 55. The support member 45 is then placed in position such that the central portion 35 circumferentially engages the post 25, and each of the support portions 50 are then driven towards the post-mounting surface 55 to penetrate the post-mounting surface 55 in a substantially longitudinal direction relative to the post 25 via their respective cutting edges 58. The post 25 reaches a desired depth inside the post-mounting surface 55 when the first surface 60 of the central portion 35 (and by extension, the support member 45) abuts the post-mounting surface 55.

The support elements 85, the clamp members 100, and the arcuate legs 105 may then be coupled to the support member 45 and the post 25, thus completing the installation of the first sub-assembly 20. The support elements 85 of the support assembly 80, with the assistance of the arcuate legs 105, function to secure the post 25 with respect to shear forces acting on the post 25. It will be appreciated that due to the arcuate manner in which the arcuate legs 105 engage the post-mounting surface 55, the arcuate legs 105 may also function to secure the post 25 with respect to longitudinal forces acting on the post 25.

It is envisaged that the support portions 50 of the support member 45 may alternatively be driven into the post-mounting surface 55 without the post 25 being present initially. Once the support portions 50 have penetrated the post-mounting surface 55, the post 25 may be subsequently installed as a separate step. Alternatively, the support member 45 may firstly be pre-installed to the post 25 at a pre-determined location along the post 25. Thereafter, the support member 45 and the post 25 can be simultaneously driven into the post-mounting surface 55.

The solar panels 15 are then expanded or unfolded to the unfolded configuration (for example, as shown in FIGS. 1, 2, 8 and 9) such that the first sub-assemblies 20 are spaced apart from one another and the solar panels 15 have pivotally moved (by way of the corresponding pivotal movement of the primary solar panel support member 150 about the elongated member 120, and the corresponding pivotal movement of secondary solar panel support member 170 about the coupling member 120 as discussed above) to be arranged at an angle in relation to one another. The remainder of the first sub-assemblies 20 are then installed at spaced apart locations along the post-mounting surface 55 in a similar manner as described above with respect to the first of the first sub-assemblies 20 to complete the installation of the system 10.

Figure 21:
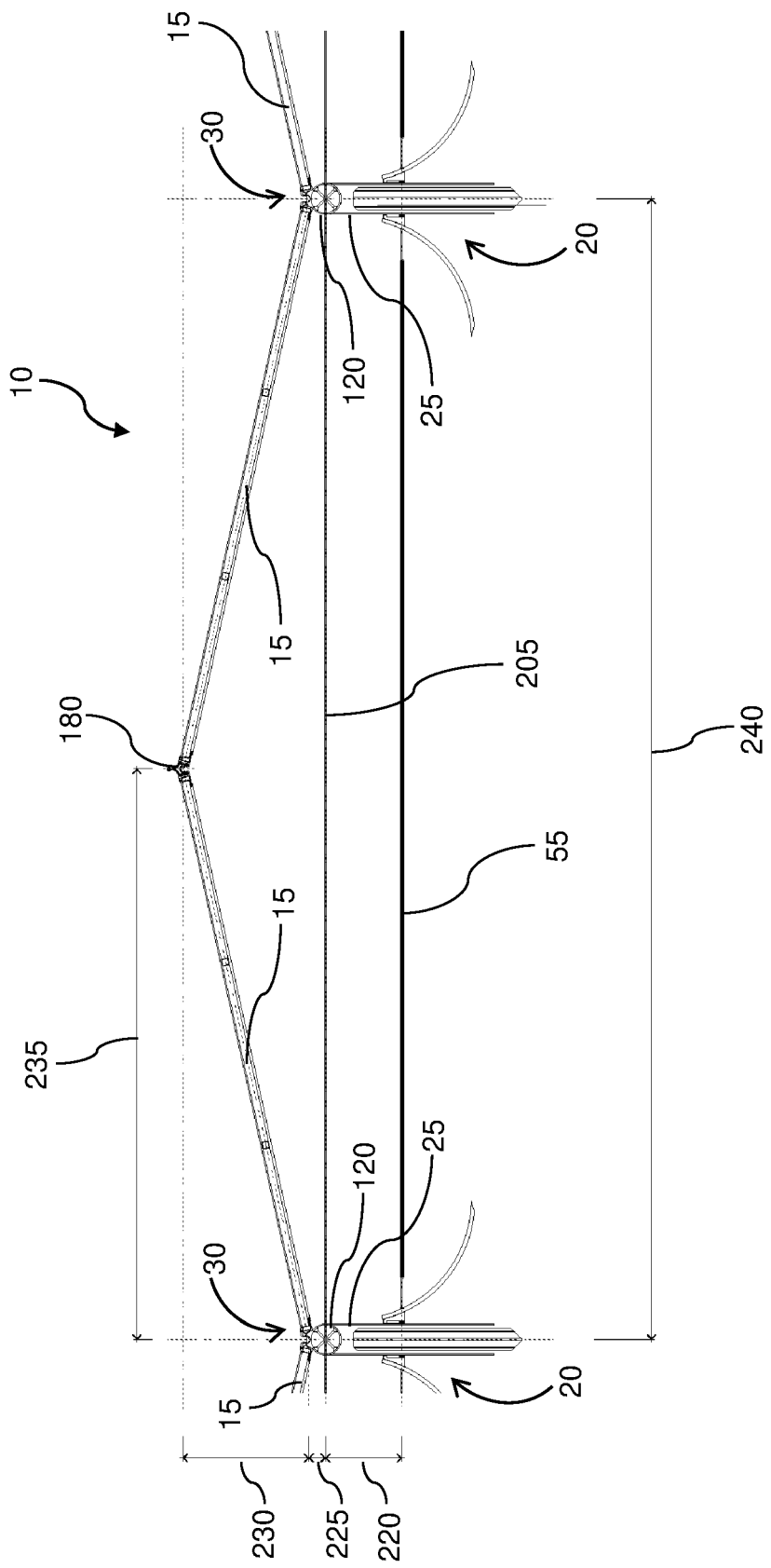
FIG. 21 is a schematic side view of the system shown in FIG. 1, illustrating exemplary dimensions.

In FIG. 21, exemplary dimensions of the system 10 in an unfolded configuration is provided. A height 220 between the post-mounting surface 55 and the restraining means 205 (or centrepoint of the elongated member 120) may, for example, range between 300 and 400 mm. A height 225 between the restraining means 205 (or centrepoint of the elongated member 120) and a point at which the solar panel 15 is mounted to the primary solar panel support member 150 may, for example, range between 40 mm and 50 mm. A height 230 between the point at which the solar panel 15 is mounted to the primary solar panel support member 150 and the coupling member 180 may, for example, range between 400 and 500 mm (depending on the angle of inclination of the solar panels 15). A length 235 between the point at which the solar panel 15 is mounted to the primary solar panel support member 150 and the coupling member 180 may, for example, range between 1500 and 1900 mm (again, depending on the angle of inclination of the solar panels 15). A length 240 between two of the first sub-assemblies 20 may, for example, range between 3500 and 4000 mm (again, depending on the angle of inclination of the solar panels 15). It will be understood that the exemplary dimensions of the system 10 in the unfolded configuration as shown in FIG. 21 are merely exemplary, and are not limited to the ranges provided. The various componentry of the system 10 may have any other suitable dimensions, depending on the design requirements of the system 10.

Figure 22:
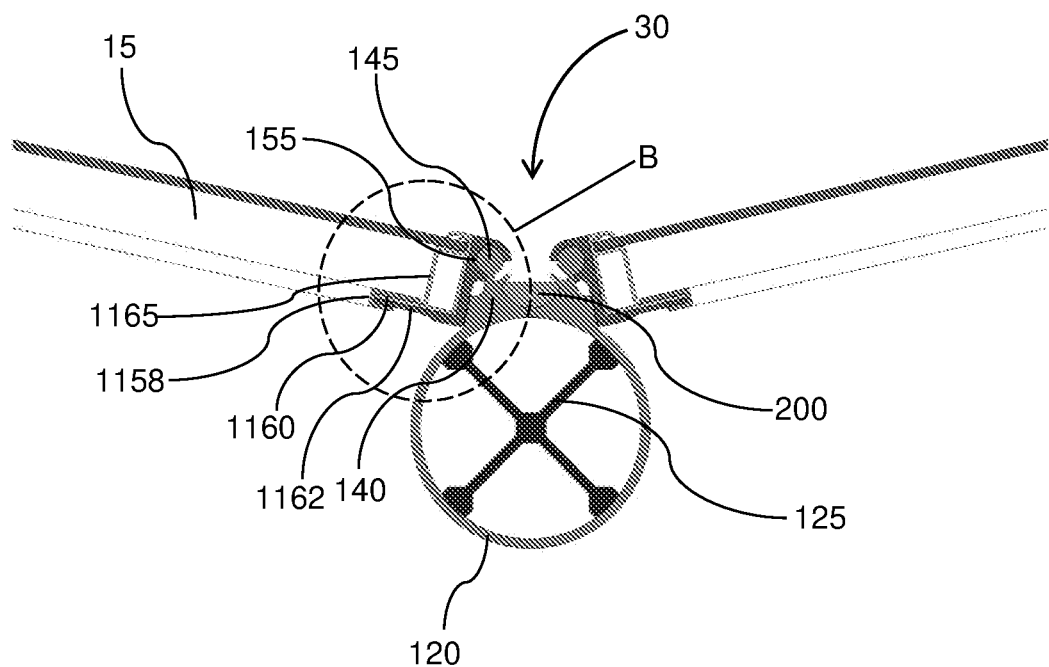
FIG. 22 is an enlarged schematic side view of an alternative embodiment of a second sub-assembly.
Figure 23:
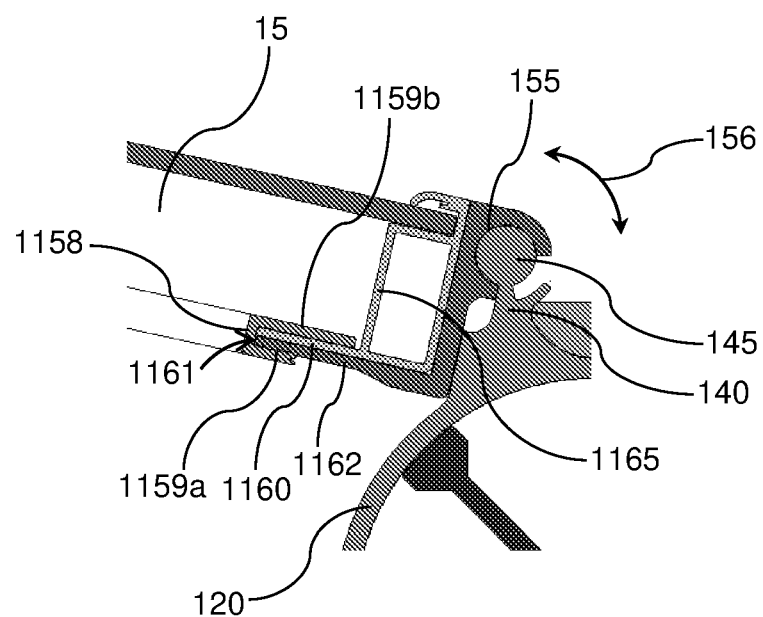
FIG. 23 is an enlarged schematic side view of portion B of the second sub-assembly shown in FIG. 22.
Figure 24:
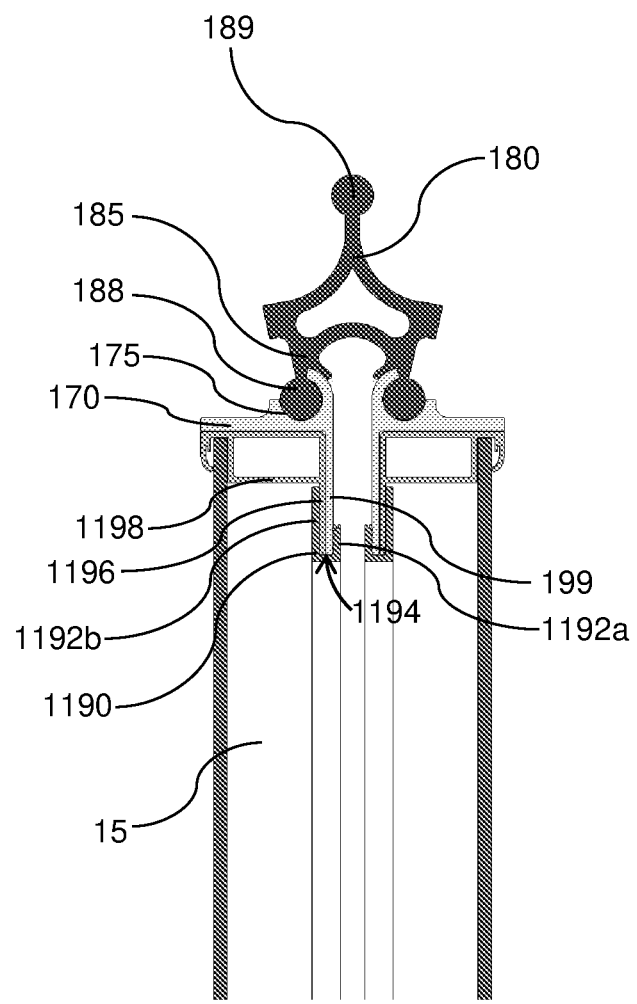
FIG. 24 is a further enlarged schematic side view of the second sub-assembly shown in FIG. 22.

Turning to FIGS. 22 to 24 of the accompanying drawings, there is schematically depicted an alternative embodiment of a system for mounting one or more solar panels 15, which operates in generally the same manner as the system 10 described above, with like reference numerals being used to indicate like features. In this alternative embodiment, the second sub-assembly 20 includes a primary clip portion 1158 which is similar to the primary clip portion 158 described above, and that may also either be separately formed or integral to the primary solar panel support member 150. The primary clip portion 1158 has a generally U-shaped cross-section having a pair of opposing arms 1159a and 1159b that define a gap 1161 therebetween to slidably receive a flat portion 1160 of a perimeter frame 1165 of the solar panel 15. In the depicted embodiment, the gap 1161 between the pair of opposing arms 1159a and 1159b receives both a flat end portion or arm 1162 of the primary solar panel support member 150, as well as the portion 1160 of the perimeter frame 1165. It will be appreciated that the variation in the structure of the primary clip portion 1158 may at least allow for the portion 1160 of a perimeter frame 1165 and the end portion or arm 1162 of the primary solar panel support member 150 to be easily slidably received in the gap 1161 between the pair of opposing arms 1159a and 1159b, but still retain a frictional or press-fit engagement therein.

In this embodiment, the second sub-assembly 20 may also include a secondary clip portion 1190 (see FIG. 24) which is similar to the secondary clip portion 190 described above, and that may also either be separately formed or integral to the secondary solar panel support member 150. In the depicted embodiment, the secondary clip portion 1190 is formed separately to the secondary solar panel support member 170 and is slidably coupled thereto. The secondary clip portion 1190 has a generally U-shaped cross-section having a pair of opposing arms 1192a and 1192b that define a gap 1194 therebetween to slidably receive a portion 1196 of a perimeter frame 1198 of the solar panel 15. In the depicted embodiment, the gap 1194 between the pair of opposing arms 1192a and 1192b receives both an end portion or arm 1199 of the secondary solar panel support member 170, as well as the portion 1160 of the perimeter frame 1198.

Figure 25:
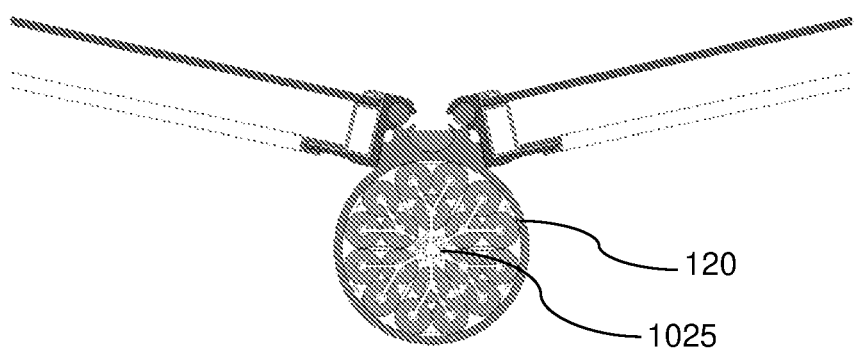
FIG. 25 is an enlarged schematic side view of an alternative embodiment of a second sub-assembly

In FIG. 25, there is schematically depicted an alternative embodiment of an inner support component 1025 which functions in a similar manner to the inner support component 125 described above. In the depicted embodiment the inner support component 1025 is formed separately and provided within the elongated member 120 to provide additional structural strength to the elongated member 120. The inner support component 1025 is provided as a plurality of tubular members that act collectively to provide additional structural strength to the elongated member 120.

Figure 26:
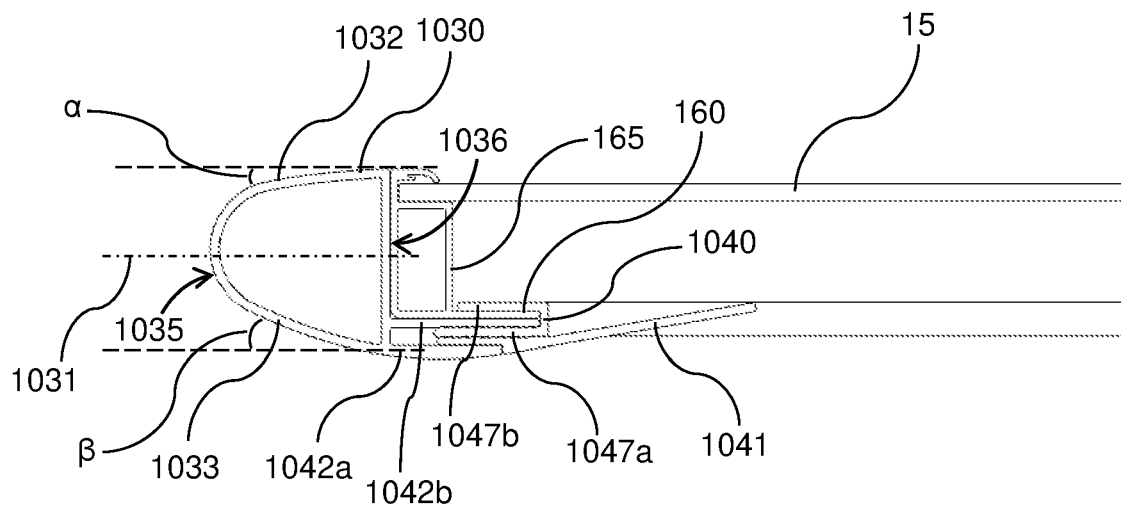
FIGS. 26 and 27 are schematic side views of a perimeter component of the system shown in FIG. 1.
Figure 27:
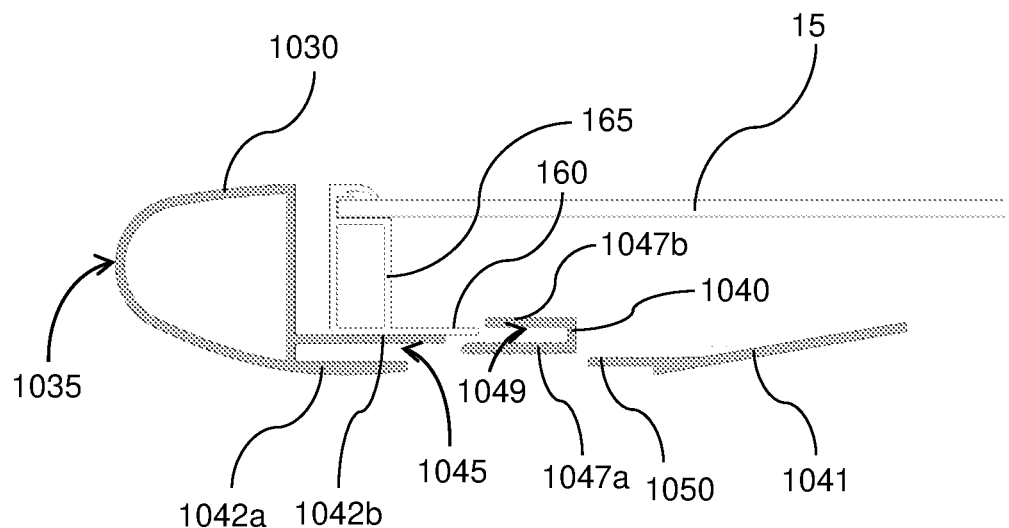
Figure 28:
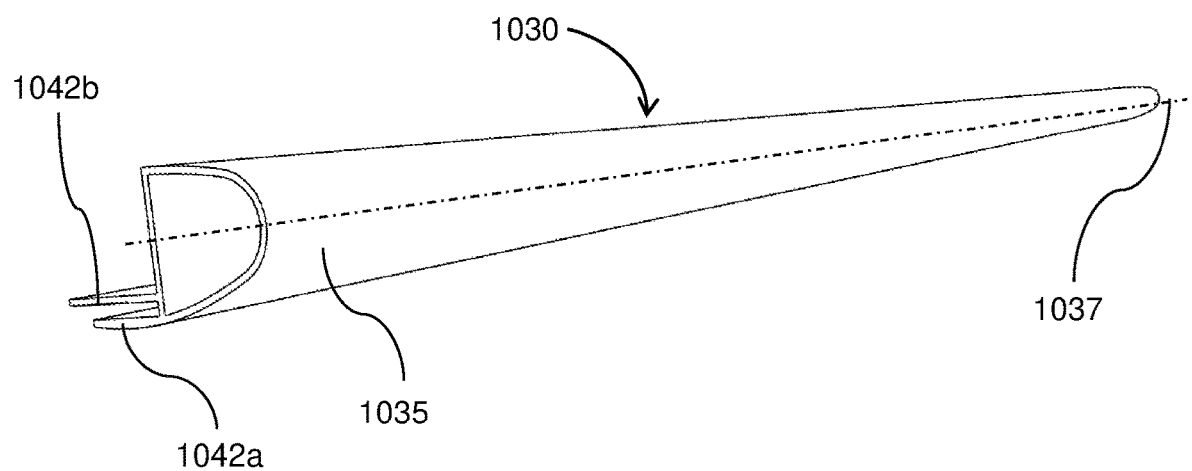
FIG. 28 is a schematic isometric view of the perimeter component shown in FIGS. 26 and 27.

In FIGS. 26 to 28, there is schematically depicted an embodiment of a perimeter component 1030 of the system 10 that is configured to be coupled to the perimeter frame 165 (or 1065) described above. The perimeter component 1030 may at least provide an additional support member to increase the structural strength of the solar panel 15 and the stiffness of the perimeter frame 165 or 1065. Accordingly, the deformation of the solar panel 15 under wind loads may also be reduced. In a preferred form, the perimeter component 1030 functions as an airfoil with a leading edge 1035 and a trailing edge 1036. The leading edge 1035 has a smooth or rounded surface, whilst the trailing edge 1036 is generally planar and arranged to abut a planar surface of the perimeter frame 165. The perimeter component 1030 as depicted in FIGS. 26 to 28 defines a cross-sectional shape having a centre line 1031 extending between the leading edge 1035 and the trailing edge 1036. The perimeter component 1030 has an arcuate upper surface 1032 and an arcuate lower surface 1033 that is asymmetrical relative to the arcuate upper surface 1032 about the centre line 1031. As shown in the Figures, the arcuate upper surface 1032 has a radius of curvature a that is less than a radius of curvature β of the arcuate lower surface 1033. In a typical lift situation, as air flows over an airflow, the pressure above an airfoil is lower than the pressure below the airfoil, which results in a net force upwards. Accordingly, by adjusting the radius of curvature of the arcuate upper surface 1032 relative to the arcuate lower surface 1033, the airflow properties, and thus the pressure above the perimeter component 1030, can be higher than the pressure below the perimeter component 1030. Having a higher pressure above the perimeter component 1030 relative to the lower pressure below the perimeter component 1030 allows for a net force downwards to counteract uplift that occurs on the perimeter edges of the solar panel 15. It will be appreciated that in other embodiments (not shown), the perimeter component 1030 may have any other shape or form suitable for coupling to the perimeter frame 165 (or an existing perimeter frame of an existing solar panel). The perimeter component 1030 is preferably extruded from aluminium and elongated along a longitudinal axis 1037 (see FIG. 28).

It is envisaged that the difference between the radius of curvature a the arcuate upper surface 1032 and the radius of curvature B of the arcuate lower surface 1033 may change the direction of the applied wind force (to the solar panel 15) from negative to positive. In conventional solar array systems, the leading edges of the perimeter frames surrounding the solar panels are typically rectangular in shape, and may thus result in additional adverse wind forces that exacerbate the already high negative forces on the solar panels. Accordingly, by having a smooth or rounded leading edge, such as leading edge 1035 describe above, and the arcuate upper and lower surfaces 1032 and 1033, the negative forces (suction, negative pressure) acting on the solar panel 15 may be alleviated, thereby allowing for a more streamlined and robust system to counter high wind situations. The shape and size of the perimeter component 1030 may be adjusted to reduce the impact of wind loads on the overall system 10. It will be appreciated that the perimeter component 1030 may be pre-installed to the system 10, or otherwise installed to an existing solar array system to increase the structural strength of the in situ solar panels.

Figure 29:
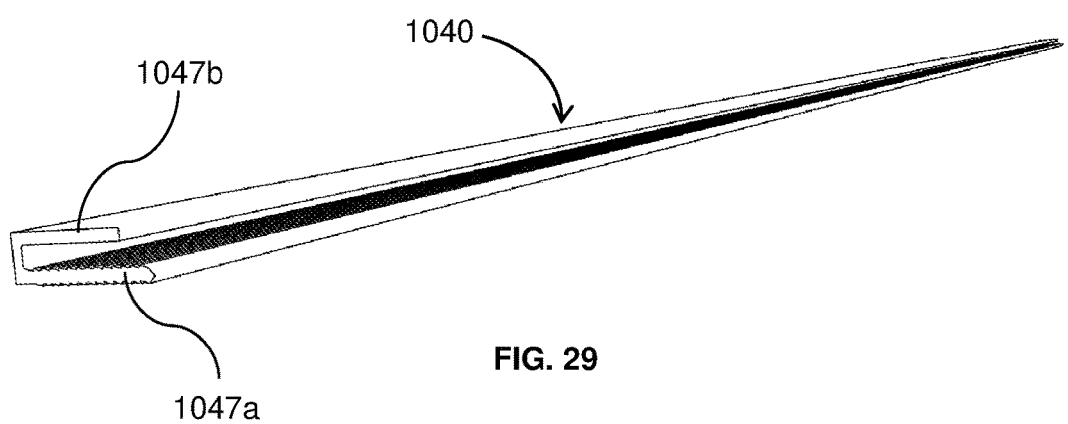
FIG. 29 is a schematic isometric view of a perimeter component clip of the system shown in FIG. 1.
Figure 30:
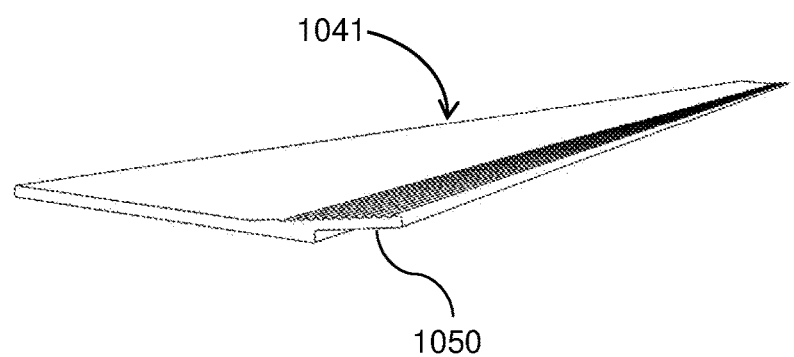
FIG. 30 is a schematic isometric view of a perimeter component arm of the system shown in FIG. 1.

As best shown in FIG. 27, the perimeter component 1030 is coupled to the perimeter frame 165 with the aid of a perimeter component clip 1040 a perimeter component arm 1041 (see also FIGS. 28 to 30). The perimeter component 1030 includes a pair of arms 1042a and 1042b that define a gap 1045 therebetween. The perimeter component clip 1040 has a generally U-shaped cross-section also having a pair of opposing arms 1047a and 1047b defining a gap 1049 therebetween. The protruding portion 160 of the perimeter frame 165 and the arm 1042b of the perimeter component 1030 are together slidably received within the gap 1049 between the pair of opposing arms 1047a and 1047b of the perimeter component clip 1040. Additionally, the arm 1047a of the perimeter component clip 1040 and an end portion 1050 of the perimeter component arm 1041 are together slidably received within the gap 1045 between the pair of opposing arms 1042a and 1042b of the perimeter component 1030. Any one or more of the pair of opposing arms 1042a, 1042b and 1047a, 1047b, the portion 160 of the perimeter frame 165, and the end portion 1050 may include protrusions, serrated surfaces, or other features to facilitate coupling. It will be appreciated that the slidably coupling arrangement of the components described above may allow the components to be installed without the use of complex tools or machinery, which may at least reduce the installation time and associated costs of assembling the system 10.

Figure 31:
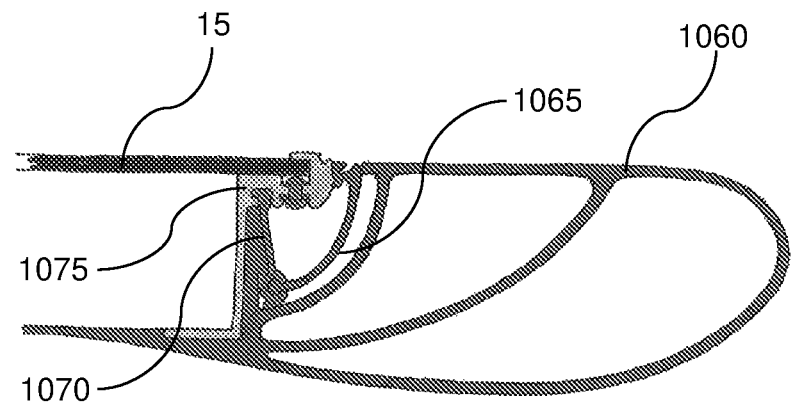
FIG. 31 is a schematic side view of an alternative embodiment of a perimeter component of the system shown in FIG. 1.

In FIG. 31, there is schematically depicted an alternative embodiment of a perimeter component 1060 of the system 10 that functions in a similar manner to the primary perimeter component 1030 discussed above. In this embodiment, the perimeter component 1060 is coupled using one or more of the locking mechanisms disclosed in the Applicant's International Patent Publication No. WO 2019/169438, the content of which is incorporated herein by reference in its entirety. In the depicted embodiment, the perimeter component 1060 includes a resiliently deformable locking arm 1065 that is adapted for frictional engagement with one or more perimeter frame components 1070, 1075. The perimeter component 1060 may thus be secured in relation to the solar panel using the locking mechanisms described International Patent Publication No. WO 2019/169438 to provide a similar functionality to the perimeter component 1030 described above, and which may also be installed without the use of complex tools or machinery.

Figure 32:
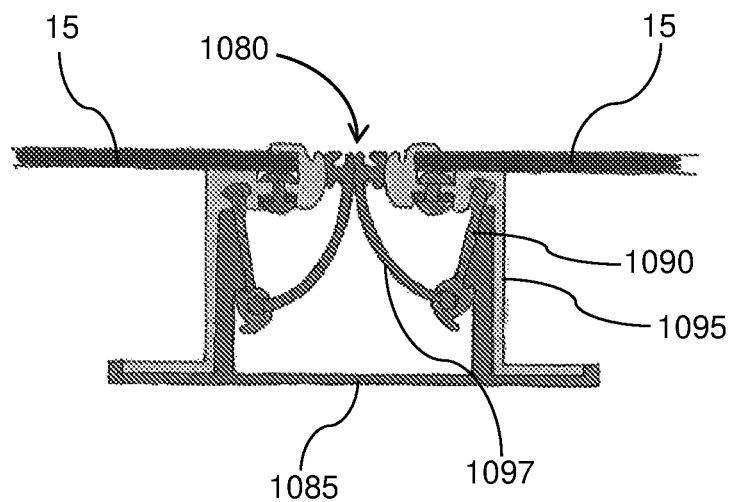
FIG. 32 is a schematic side view of an interlocking system for coupling two solar panels.

In FIG. 32, there is schematically depicted an interlocking system 1080 for coupling two solar panels 15, also using the locking mechanisms described International Patent Publication No. WO 2019/169438. The interlocking system 1080 may include a connecting member 1085 that is adapted to be slidably coupled to one or more perimeter frame members 1090, 1095, which are in turn coupled to the solar panel 15. A resiliently deformable locking arm 1097 may be provided to facilitate the engagement of the connecting member 1085 and the perimeter frame members 1090, 1095.

Experimental data from a number of controlled, detailed studies performed in wind tunnels have assisted in the understanding of the effects of wind on individual solar panels, as well as the much larger interconnected solar panel array.

The tests performed included a variation of wind direction through a full 360-degree rotation relative to the fixed angles of the solar panel array, and showed a pattern of panel behaviours that were constant for all types of arrays. For example, when the wind was blowing at oblique angle to the arrays edges, there was a 50% difference in load on the outer edge panels as compared the inner panels. When the panels were very low to the ground as compared to being raised by approximately 250 mm, there was a 20% increase in load between the outside panel edges and the inside panels. The extreme outer edges of the array were also generally affected by about 10% more force than outer edges on the inner panels of the array.

Over a full 360-degree rotational test of the wind direction, the experimental data indicated that the outer edges were affected by an approximately 10% to 20% increase in load over the inner edges. In consideration of all test results, it was apparent that the highest impact of wind on a solar panel array is on the leading edges of both the inner and outer exposed panels, with the greatest impact being on the extreme outside edges of the array (i.e. approximately 20% greater than any other part of the array). From the experimental data, it was also evident that the greatest force imparted to the solar panel array by wind was due to negative pressure or suction, with the leading edges having the highest rating.

Figure 33:
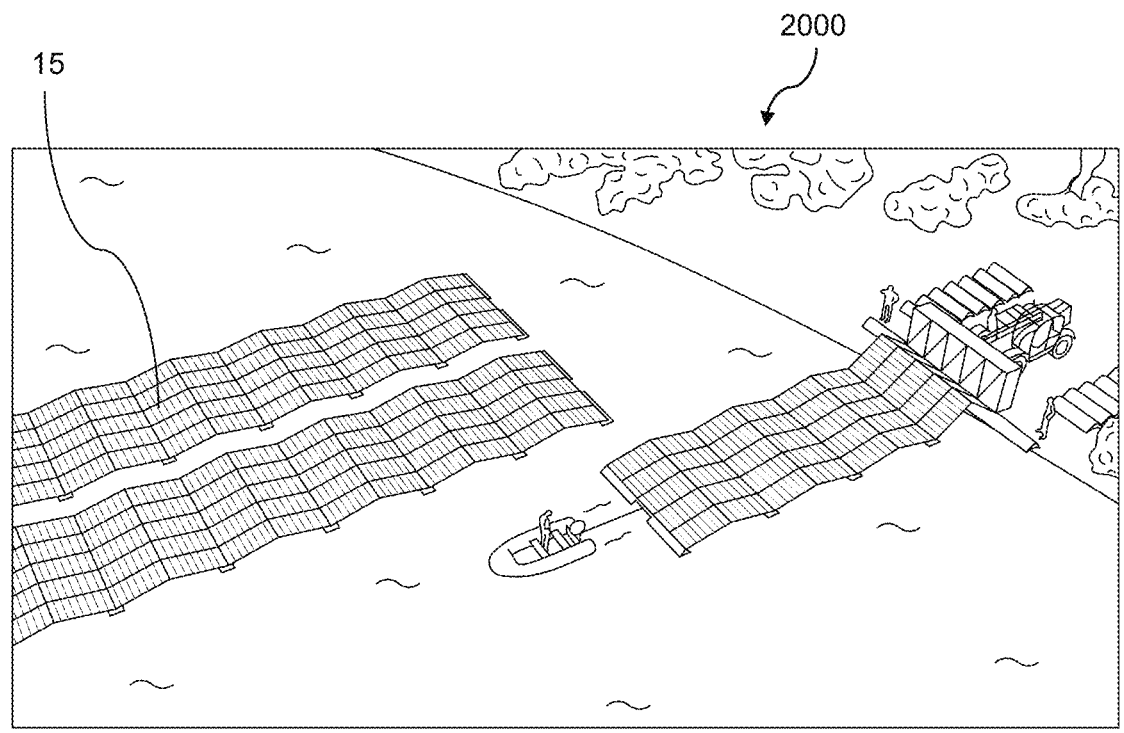
FIGS. 33 and 34 are schematic views of a floating system for mounting one or more solar panels.
Figure 34:
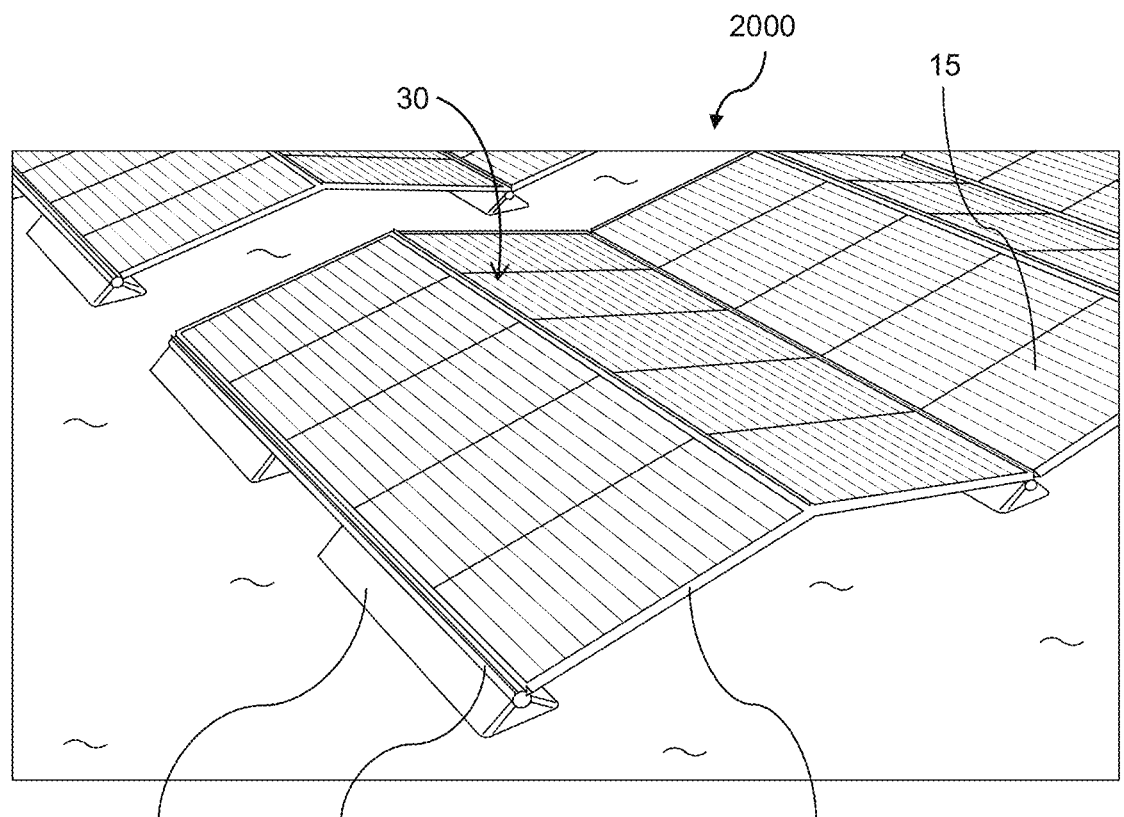

In FIGS. 33 and 34, there is schematically depicted a floating system 2000 for mounting one or more solar panels 15, which functions in a similar manner to the system 10 described above. In this embodiment, the floating system is adapted to be installed over a body of water to provide an alternative over ground-mounted systems. The elongated member 120 described above in relation to the system 10 may adapted to include one or more buoys or floatation devices 2005 such that the second sub-assembly 30 of the system may be installed over the water.

Various forms of the systems described above may have one or more of the following advantages. The footing of the system (e.g. the first sub-assembly described above) may include a number of components which engage with a post at multiple points around the circumference of the post and at multiple points along the length of the post, thereby increasing the capacity of the post to withstand high shear forces acting on the post. The support members of the footing may be designed to provide large surface areas which engage the post-mounting surface, thus increasing the stability of the post with respect to the post-mounting surface and also with respect to shear forces acting on the post. The system may be installed without complex machinery, with little to no need for tools or manual skills that may otherwise be required to assemble conventional mechanical fastening means such as nuts, bolts and screws, and may also be installed without the use of concrete reinforcement or other permanent forms of attachment. This may provide for a relatively simple, efficient and cost-effective way to install, uninstall, re-locate and re-use both the system at another site.

The system may also be transported with the solar panels therein, thereby reducing the onsite construction time of a PV power generation plant. The method of installing the system onsite is also a relatively simple and short process. As discussed above, a system that is constructed according to the installation method described above can also be deconstructed in a relatively short and simple manner, and subsequently transported to a new site, and relatively quickly and simply reconstructed at the new site. Accordingly, the system may at least provide a PV power generation plant that is quick and easy to construct/deconstruct, suitable for use on projects that are remote from electrical networks and have a relatively short service life.

It will be appreciated that the various componentry of the system may at least allow for a continuous hinge mechanism to be formed to support the solar panels (e.g. the coupling between the elongated member 120 and the primary solar panel support member 150). This arrangement may thus be stronger and provide better support of the individual solar panels, and also allow for less load stress on the panels. In contrast, conventional systems may hold each solar panel in one or more corner only, which may result in excessive torsioning and possible cracking and breakage of the solar panels, with the load concentrated in small area of the panel. The cost of our fabricating the various componentry of the system described herein (for example, by extrusions of suitable materials such as aluminium) may at least allow for a substantially full-length hinge to be formed, which may be less costly and easier to install than the individual hinges and conventional fastening means of conventional systems.

It will also be appreciated that conventional systems typically rely on the use of expensive precast concrete footing has a large footprint and is thus bulky and heavy. Such concrete footings are typically intended to be used as a levelling device and as a counterbalance to the wind load imparted by tropical cyclones, for example. It will, however, be appreciated that such concrete footings may only efficient up to Wind Region B as the total ballast weight may only be about 50 kg per square meter, of solar panel area, which may not be sufficient to counter wind loads of approximately 248 kph (such as in Wind Regions C) or approximately 316 kph (such as in Wind Regions D). The system described herein, in contrast, utilise components such as lightweight tubular aluminium beams, for example, that are continuously connected to an edge of a solar panel using a hinge mechanism that does not rely on conventional mechanical fastening means such as nuts, bolts, and screws. Accordingly, the arrangement of the system described herein may at least provide better strength, is cheaper to manufacture, and is simpler to install.

In order to strengthen the solar panels themselves and to prevent failure through bending in cyclonic conditions (such as Category 5 conditions), the systems described herein may at least include additional structural members to the length of the solar panels (for example, the perimeter component described above), as well as cross-members, which may at least reduce the unsupported areas of the solar panels. These additional structural members can be added or removed to the system to suit the worst-case scenario in any one location. As these additional structural members are preferably formed of aluminium extrusions, they may at least present a relatively economic solution to a very real problem.

Further, for conventional systems to withstand Region C wind loads, for example, it may be necessary to add additional mechanisms to the footing system to prevent the entire system from lifting off the ground. The systems described herein, in contrast, do not rely on the use of concrete footings and include various componentry that may at least counter the uplift generated by winds, in Regions B, C & D, without the need for additional mechanisms to the footing system.

It will also be understood that conventional systems typically require the ground to be extremely level for installation, as the concrete footings, for example, must sit flat on the ground. Any minor variations may result in a distortion of the solar panels through twisting or torsioning. The systems described herein may at least account for most undulations or variations in the landform, for example, up to 400 mm, in a localised area. Accordingly, the systems described herein may at least reduce or altogether avoid the need for major earth works as required by conventional systems.

As discussed above, the systems described herein may be assembled offsite and delivered onsite to be installed. The systems may, for example, be electrically complete when unfolded. It is envisaged that the systems described herein may, in some embodiments, include an on-board battery pack (not shown) that is concealed within the componentry (for example, in the elongated member or directly underneath the solar panels). It is envisaged that the battery pack may be customised to suit a desired panel wattage of the system, with the solar panels and the battery systems being linked together to form a "plug-and-play" type system for specific, portable power and battery storage. This arrangement may at least avoid the need for a major battery farm as an isolated package. The systems described herein may at least allow the power supply to be divided up into simpler, smaller and more efficient power storage systems.

Figure 35:
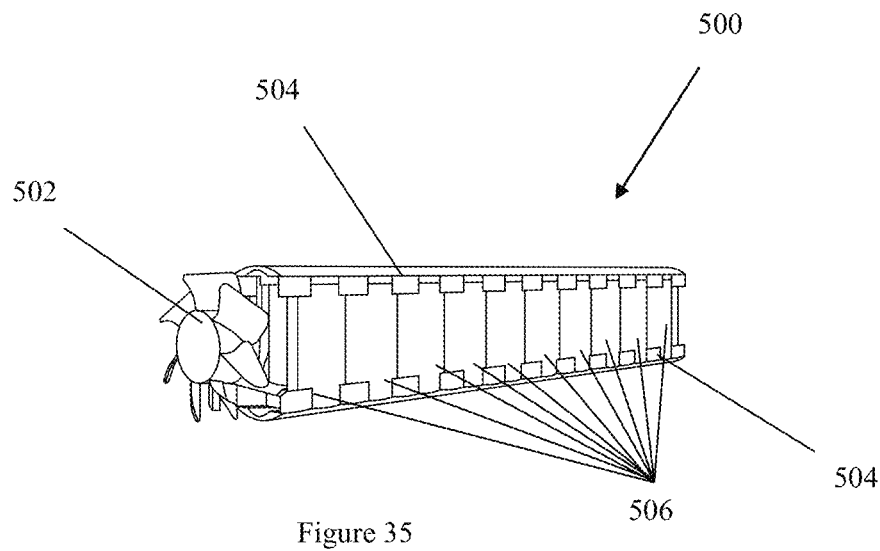
FIG. 35 is a perspective view of a battery for use with the system of FIG. 1.
Figure 36:
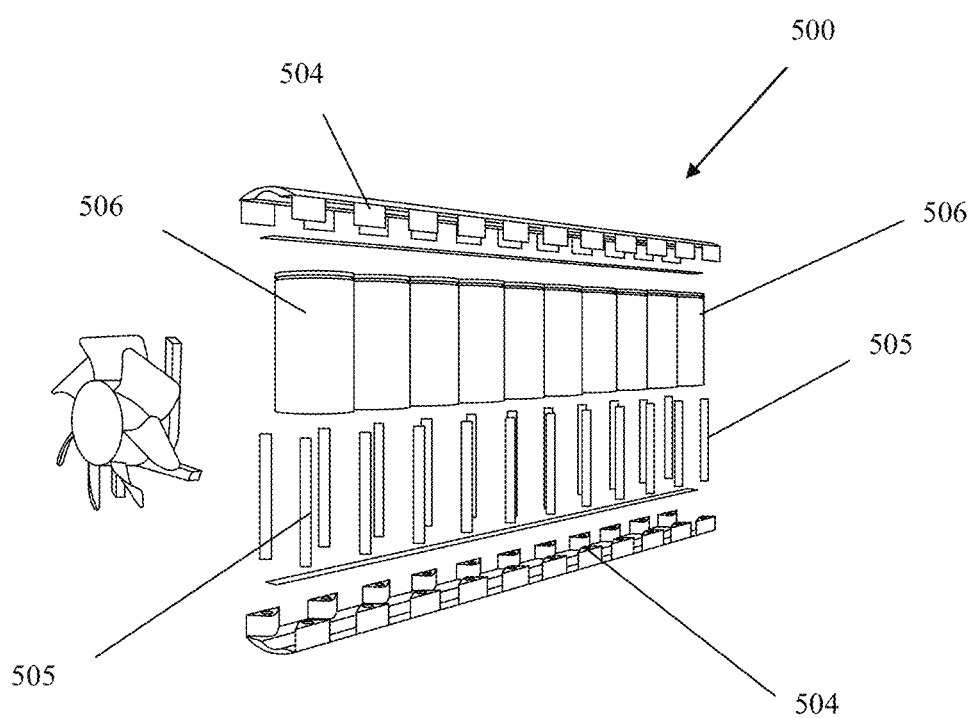
FIG. 36 is an exploded view of the battery of FIG. 35.

With reference to FIGS. 35 and 36 examples of the on-board battery pack 500 for connection to the system 10. The battery pack 500 includes a cooling fan 502, a plurality of battery cells 506, an upper and lower capping 504 and spacers 505 arranged to extend between the upper and lower capping means. The on-board battery pack is arranged to connect to an end of the elongated member 120 and project form it in the longitudinal direction.

FIGS. 37, 38 and 39 illustrate a third sub-assembly 600 that can be used in place of the first sub-assembly 20 with the second sub-assembly 30 as described above, replacing the post 25, and a central portion 35 for mounting the one or more solar panels 15 in a further embodiment of the present invention.

The third sub-assembly includes angled posts 625 crossing each other at intersection point 606 distal support surface penetrating ends 604 of the angled posts 625. Penetrating ends 604 of the angled post 625 are arranged to penetrate a post-mounting surface 655 in use. Each angled post 625 is configured to penetrate a post-mounting surface 655 at an angle to the other angled post 625. In one embodiment, the angle between the angled posts 625 at intersection point 606 is 90°. It is envisaged that the angled posts 625 may be formed from materials such as galvanised or heavy gauge steel, aluminum, or the like. It will be appreciated that the angled posts 625 may each penetrate a post-mounting surface 655 and the angle between the angled posts 625 assists in reducing or preventing both uplift and down forces on the third sub-assembly 600.

Engagement bracket 601 engages elongated member 120 and angled posts 625. Engagement bracket 601 includes a central plate 603. The central plate 603 includes an aperture profiled to match the outer profile of elongate member 120 and receive the elongate member 120.

Sides of the central plate 603 adjacent the angled posts 625 include rolled portions 605 arranged to receive the angled posts 625. Rolled portions 605 are arranged to be on the lower side of the arrangement of the engagement bracket in use. Rolled portions 605 are rolled to include an internal passageway profiled to receive the outer profile of the angled posts 625 acting as a receiving portion.

In an alternative embodiment, the rolled portions are replaced with rings, channels or other receiving portion to receive and hold the angled post 625.

In use the internal passageway of rolled receiving portions 605 are arranged to receive the angled posts 625, The angled posts 625 include flattened enlarged ends 627. The flattened enlarged ends 627 extend outwards from the diameter of the angled posts so that the flattened enlarged ends 627 extend beyond the diameter of the rolled portions 605 in use.

In an alternative embodiment the end of the angled posts 625 includes pins, bosses or an alternative protrusion extending outwards from the angled posts 625 in place of the flattened enlarged head 627 as restraining means.

In use, with the angled posts 625 engaged with the post-mounting surface 655 and the engagement bracket 601, the flattened enlarged ends 627 restrain the fourth sub-assembly 601 in place by providing a stop on the movement of the rolled portions 605, thereby engaging the third sub-assembly.

To install the third sub-assembly, the penetrating ends 604 of the angled posts 625 are passed through the passageway of the rolled portions 605 of the engagement bracket 601. The penetrating ends 604 of the angled posts 625 are driven into the post-mounting surface and ends of an elongate member 120 are placed through two adjacent third sub-assemblies to mount a solar panel 15.

Although specific embodiments of the invention are illustrated and described herein, it will be appreciated by those of ordinary skill in the art that a variety of alternative and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", etc. are used merely as labels, and are not intended to impose numerical requirements on or to establish a certain ranking of importance of their objects.

The invention claimed is:

1. A system for mounting one or more solar panels, the system comprising:
   a third sub-assembly comprising:
      angled posts arranged transverse to each other, each angled post including a penetrating end arranged to penetrate and engage a post-mounting surface;
      an engagement bracket arranged to engage the angled posts in use; and
   a second sub-assembly comprising:
      an elongated member adapted to be mounted to the engagement bracket at a distance from the post-mounting surface and to extend in a direction substantially perpendicular to the longitudinal direction of the post, the elongated member including at least one male portion that is elongated along a longitudinal axis of the elongated member; and a solar panel support member arranged to slidably receive an edge of a solar panel and including a female portion adapted to receive the at least one male portion of the elongated member, the solar panel support member adapted for pivotal movement about the longitudinal axis of the elongated member to provide a corresponding pivotal movement of the solar panel mounted thereto.

2. The system as claimed in claim 1, wherein the engagement bracket includes an aperture profiled to receive the elongated member.

3. The system as claimed in claim 1, wherein the engagement bracket includes receiving means arranged to receive each of the angled posts.

4. The system as claimed in claim 3, wherein the receiving means are arranged on sides of a central plate of the engagement bracket.

5. The system as claimed in claim 3, wherein the receiving means is a rolled portion.

6. The system as claimed in claim 1, wherein the angled posts included a restraining means distal the penetrating end.

7. The system as claimed in claim 6, wherein the restraining means is a flattened enlarged head.

8. The system as claimed in claim 1, wherein the engagement bracket is arranged to be distal the post mounting surface.

9. The system of claim 1, wherein the second sub-assembly further comprises a clip portion that is integrally formed with the solar panel support member, the clip portion having a pair of arms defining a gap therebetween to receive a portion of a perimeter frame of the solar panel.

10. The system of claim 1, wherein the solar panel support member is a primary solar panel support member, and the second sub-assembly further includes a secondary solar panel support member arranged to slidably receive an opposing edge of the solar panel.

11. The system of claim 3, wherein the second sub-assembly further comprises a coupling member having at least one male portion, and the secondary solar panel support member includes a female portion adapted to receive the male portion of the coupling member, with the secondary solar panel support member adapted for pivotal movement to provide a corresponding pivotal movement of the solar panel mounted thereto.

12. The system of sclaim 1, wherein the at least one male portion of the elongated member includes an end portion having a substantially circular cross-section that is elongated along the longitudinal axis of the elongated member.

13. The system of claim 12, wherein the female portion of the solar panel support member is formed as a cradle having a substantially circular cross-section corresponding to the substantially circular cross-section of the end portion of the elongated member.

14. The system of claim 1, wherein the system includes two or more third sub-assemblies, second sub-assemblies, and solar panels to form an array that is movable between a folded configuration and an unfolded configuration.

15. The system of claim 9, further including a perimeter component adapted to be coupled to the perimeter frame of the solar panel, the perimeter component having a cross-sectional profile of an airfoil.

16. The system of claim 15, wherein the perimeter component includes an arciate upper surface and an arcuate lower surface, with the arcuate upper surface having a radius of curvature that is less than a radius of curvature of the arcuate lower surface.

* * * * *